(12) United States Patent
Akiyama

(10) Patent No.: US 7,462,998 B2
(45) Date of Patent: Dec. 9, 2008

(54) APPARATUS AND METHOD FOR GENERATING ACCELERATION PROFILE FOR CONTROLLING OBJECT USING OPTIMIZED WAVEFORM SHAPING

(75) Inventor: Shigeki Akiyama, Ichinomiya (JP)

(73) Assignee: Brother Kogyo Kabushiki Kaisha (JP)

( * ) Notice: Subject to any disclaimer, the term of this patent is extended or adjusted under 35 U.S.C. 154(b) by 0 days.

(21) Appl. No.: 11/523,625

(22) Filed: Sep. 20, 2006

(65) Prior Publication Data

US 2007/0075670 A1    Apr. 5, 2007

(30) Foreign Application Priority Data

Sep. 20, 2005   (JP) .................. P2005-272367

(51) Int. Cl.
*G05D 3/12* (2006.01)
*G05D 13/00* (2006.01)

(52) U.S. Cl. ................. 318/162; 318/561; 318/626

(58) Field of Classification Search ........... 318/162, 318/256–279, 560, 561, 567, 609–611, 625–627, 318/651

See application file for complete search history.

(56) References Cited

U.S. PATENT DOCUMENTS

| | | | | |
|---|---|---|---|---|
| 3,673,395 A | * | 6/1972 | Tripp | .............. 702/96 |
| 3,813,592 A | * | 5/1974 | Ryberg | .............. 318/696 |
| 3,969,615 A | * | 7/1976 | Bowers et al. | .............. 700/189 |
| 4,226,546 A | * | 10/1980 | Hoffman | .............. 400/144.2 |
| 4,808,895 A | * | 2/1989 | Fujita et al. | .............. 318/400.09 |
| 5,325,028 A | * | 6/1994 | Davis | .............. 318/560 |
| 5,331,542 A | * | 7/1994 | Itoh | .............. 700/63 |
| 5,434,489 A | * | 7/1995 | Cheng et al. | .............. 318/568.15 |
| 6,408,216 B1 | | 6/2002 | Adachi | |
| 6,838,855 B2 | * | 1/2005 | Kobayashi et al. | .......... 318/800 |
| 6,873,490 B2 | * | 3/2005 | Guo et al. | .............. 360/78.07 |
| 7,042,185 B2 | * | 5/2006 | Yang et al. | .............. 318/568.18 |
| 7,215,095 B2 | * | 5/2007 | Sekiguchi | .............. 318/575 |
| 2003/0179359 A1 | * | 9/2003 | Korenaga | .............. 355/75 |
| 2005/0128460 A1 | * | 6/2005 | Van Den Biggelaar et al. | .............. 355/72 |
| 2006/0082922 A1 | * | 4/2006 | Shih | .............. 360/78.06 |

FOREIGN PATENT DOCUMENTS

| | | |
|---|---|---|
| JP | 5-38861 | 2/1990 |
| JP | 11-353029 | 12/1999 |
| JP | 2000-203115 | 7/2000 |
| JP | 2004-166458 | 6/2004 |

* cited by examiner

*Primary Examiner*—Bentsu Ro
(74) *Attorney, Agent, or Firm*—Banner & Witcoff, Ltd.

(57) ABSTRACT

A technique is disclosed for generating an acceleration profile indicative of a time history of an acceleration of a controlled object, to thereby generate at least one of a target velocity profile indicative of a time history of a target velocity of the controlled object and a target position profile indicative of a time history of a position of the controlled object. This technique includes: storing in a storage, a duration of a non-constant-velocity phase during which the target velocity of the controlled object varies with time; and generating the acceleration profile, based on the duration of the non-constant velocity phase stored in the storage, such that a portion of the acceleration profile which corresponds to the non-constant-velocity phase is generally curved.

22 Claims, 12 Drawing Sheets

APPARATUS AND METHOD FOR GENERATING ACCELERATION PROFILE FOR CONTROLLING OBJECT USING OPTIMIZED WAVEFORM SHAPING

CROSS-REFERENCE TO RELATED APPLICATIONS

This application is based on Japanese Patent Application No. 2005-272367 filed Sep. 20, 2005, the content of which is incorporated hereinto by reference.

BACKGROUND OF THE INVENTION

1. Field of the Invention

The invention relates to techniques of generating an acceleration profile of a controlled object, and more particularly to techniques of generating an acceleration profile for allowing a velocity and/or a position of a controlled object to be controlled so as to achieve a target velocity and/or a target position with enhanced accuracy.

2. Description of the Related Art

A bang-bang control algorithm is known as a conventional control algorithm for controlling a velocity and/or a position of a controlled object (e.g., a moving object, a rotating object, etc.) to achieve a target velocity and/or a target position.

FIG. 12 explains the process of generating a target velocity profile of a controlled object by the use of a conventional bang-bang control algorithm.

More specifically, FIG. 12(a) graphs an acceleration profile indicative of a time history of an acceleration of the controlled object, and FIG. 12(b) graphs a target velocity profile indicative of a time history of a velocity of the controlled object, which profile is generated based on the acceleration profile shown in FIG. 12(a).

FIG. 12(c) illustrates a table storing therein various parameters (tuning parameters or profile parameters) which cooperate to define a desired acceleration profile.

The various parameters include the duration T1 (=100 msec) of an acceleration phase, the duration T2 (=100 msec) of a constant-velocity phase, the duration T3 (=100 msec) of a deceleration phase, and a constant velocity V (=15 inch/sec) during the constant velocity phase, all of which have been stored in the table shown in FIG. 12(c).

In an example where a conventional bang-bang control is performed, for the creation of the target velocity profile shown in FIG. 12(b), the acceleration profile shaped as a square waveform as shown in FIG. 12(a) is first generated using the various parameters stored in the table shown in FIG. 12(c).

The target velocity profile shown in FIG. 12(b) is generated by integrating accelerations of the controlled object occurring in accordance with the acceleration profile shown in FIG. 12(a).

It is added that a target position profile indicative of a time history of a position of the controlled object can be generated by integrating velocities of the controlled object occurring in accordance with the target velocity profile shown in FIG. 12(b).

Japanese Patent Application Publication No. HEI 11-353029 discloses a conventional control algorithm for controlling the velocity of a controlled object to achieve its target velocity.

This algorithm, constructed by focusing on the torque of a motor which is an example of a drive source for driving a controlled object, allows a target velocity profile during an acceleration phase to be generated to have a shape formed by combining a constant-acceleration portion and an exponential acceleration portion.

During the constant-acceleration portion, a target velocity increases over time from a start point of acceleration, so as to be graphically represented by a straight line.

On the other hand, during the exponential acceleration portion, the target velocity increases over time exponentially, before reaching a constant-velocity phase which follows the acceleration phase.

BRIEF SUMMARY OF THE INVENTION

When the velocity and/or position of a controlled object is controlled by the aforementioned conventional bang-bang control algorithm, the rate (hereinafter, referred to as "jerk") of change of the acceleration of the controlled object changes over time largely, possibly resulting in undesirable vibration in the controlled object.

Thus, the conventional bang-bang control algorithm has limitations on the controlling of the velocity and/or position of a controlled object to achieve a target velocity and/or a target position with increased accuracy.

In addition, the torque of a motor which is an example of a drive source for driving a controlled object is proportional to the acceleration of the controlled object, theoretically. However, it is realistic that the motor attempts to continue rotating due to its inertia, even after turning-off the supply of current to the motor.

For the above reasons, the torque of a motor changes along a profile that exhibits on a graph having a horizontal axis representative of rotation speeds of the motor and a vertical axis representative of torques of the motor, such that the motor torque rises from zero in response to the turning-on of the supply of current to the motor, thereafter the motor torque is kept constant at a give value, and then the motor torque drops exponentially to zero in response to the turning-off of the supply of current to the motor.

That is to say, the turning-off of the supply of current to the motor cannot produce a motor-torque turn-off profile in the shape of a stepped waveform allowing a desired instantaneous (extremely rapid) change in torque.

As a result, there is no proportional relation between a square-waveform acceleration profile (corresponding to a current-command-value profile indicative of a time history of a command value of current supplied to the motor) which is generated for a conventional bang-bang control algorithm, and a torque profile of a motor (i.e., an actual torque profile indicative of a time history of a torque actually produced by the motor) during, for example, the period over which the slope of the acceleration of the controlled object is steep.

Due to the absence of a proportional relation between the acceleration profile (i.e., the current-command-value profile) and the torque profile (i.e., the actual torque profile), energy loss is invited in the motor, resulting in adverse effects on efficient utilization of electric power supplied to the motor.

The technique disclosed in the aforementioned publication, which would achieve higher efficiency with which energy is utilized in a motor, than when the aforementioned bang-bang control algorithm is employed, generates an acceleration profile in the shape of a staircase, with an increased peak value of the current of the motor, and eventually with an increased load on a driver for the motor.

It is therefore an object of the invention to provide techniques of generating an acceleration profile of a controlled object, and more particularly to techniques of controlling a velocity and/or a position of a controlled object so as to achieve a target velocity and/or a target position with enhanced accuracy.

According to a first aspect of the present invention, there is provided an apparatus for generating an acceleration profile indicative of a time history of an acceleration of a controlled object, to thereby generate at least one of a target velocity profile indicative of a time history of a target velocity of the controlled object and a target position profile indicative of a time history of a position of the controlled object.

This apparatus comprises:

a storage storing a duration of a non-constant-velocity phase during which the target velocity of the controlled object varies with time; and an acceleration profile generator generating the acceleration profile, based on the duration of the non-constant-velocity phase stored in the storage, such that a portion of the acceleration profile which corresponds to the non-constant-velocity phase is generally curved.

According to a second aspect of the present invention, there is provided an apparatus for forming an image using a motion of a movable member.

This apparatus comprises:

an acceleration profile generator generating an acceleration profile indicative of a time history of an acceleration of the movable member, the acceleration profile being usable for generating a target velocity profile indicative of a time history of a target velocity of the movable member and a target position profile indicative of a time history of a target position of the movable member;

a target velocity profile generator generating the target velocity profile by integrating accelerations of the generated acceleration profile;

a target position profile generator generating the target position profile by integrating velocities of the generated target velocity profile;

a drive mechanism driving the movable member; and a controller controlling the drive mechanism, such that the generated target position profile and an actual position profile indicative of a time history of an actual position of the movable member become closer to each other.

In this apparatus, the acceleration profile generator generates the acceleration profile, such that a portion of the acceleration profile which corresponds to the non-constant-velocity phase is generally curved.

According to a third aspect of the present invention, there is provided a method of generating an acceleration profile indicative of a time history of an acceleration of a controlled object, to thereby generate at least one of a target velocity profile indicative of a time history of a target velocity of the controlled object and a target position profile indicative of a time history of a position of the controlled object.

This method comprises:

a first storing step of storing in a storage, a duration of a non-constant-velocity phase during which the target velocity of the controlled object varies with time; and an acceleration profile generating step of generating the acceleration profile, based on the duration of the non-constant-velocity phase stored in the storage, such that a portion of the acceleration profile which corresponds to the non-constant-velocity phase is generally curved.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities show. In the drawings.

DETAILED DESCRIPTION OF THE INVENTION

Figure 1:
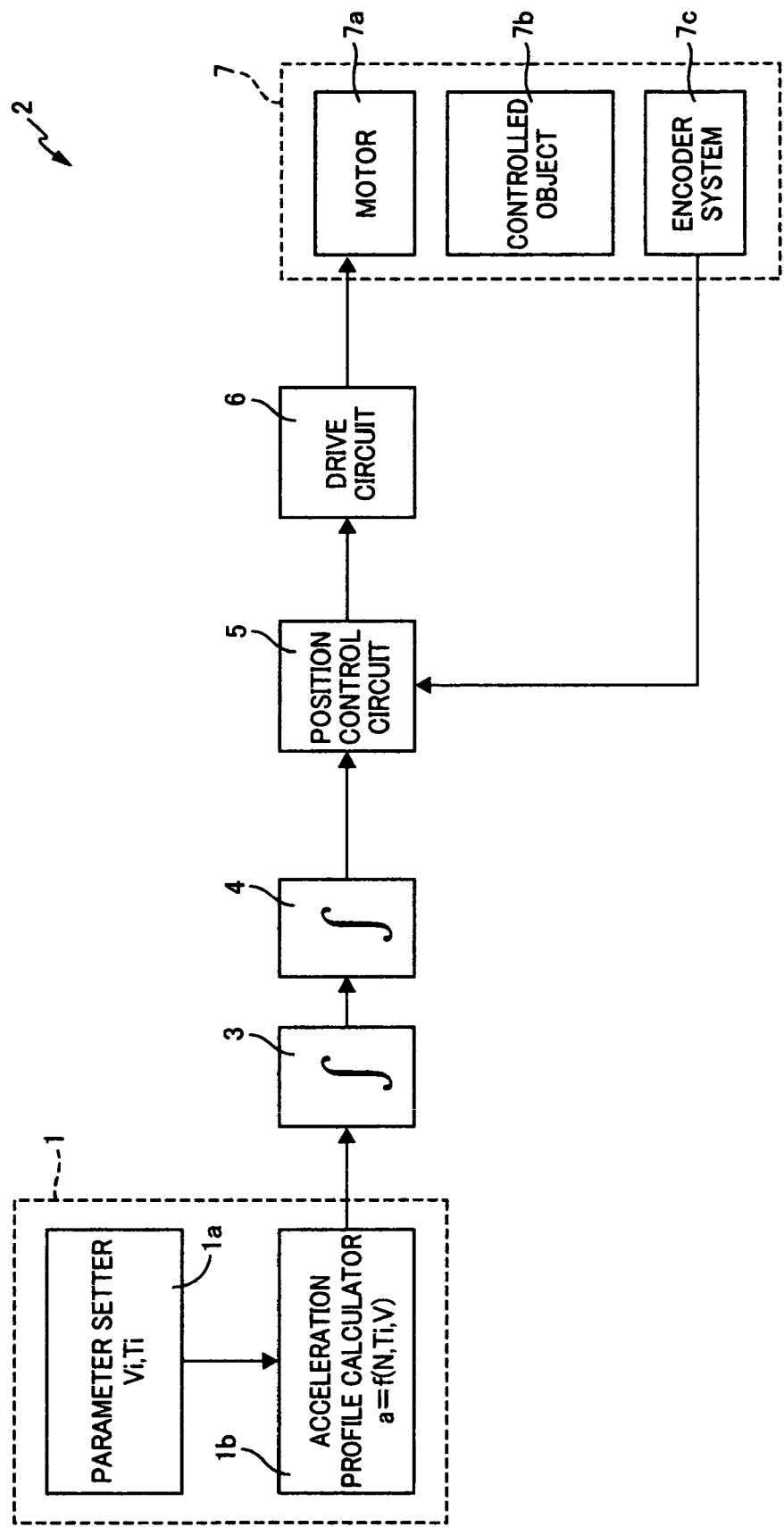
FIG. 1 is a functional block-diagram illustrating a servo-system mechanism 2 incorporating an acceleration profile generator 1 constructed in accordance with one embodiment of the present invention.

The object mentioned above may be achieved according to any one of the following modes of this invention.

These modes will be stated below so as to be sectioned and numbered, and so as to depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the modes of the invention in such a dependent form as to depend from the other mode or modes does not exclude the possibility that the technological features set forth in a dependent-form mode become independent of those set forth in the corresponding depended mode or modes and to be removed therefrom. It should be interpreted that the technological features set forth in a dependent-form mode is allowed to become independent, where appropriate.

(1) An apparatus for generating an acceleration profile indicative of a time history of an acceleration of a controlled object, to thereby generate at least one of a target velocity profile indicative of a time history of a target velocity of the controlled object and a target position profile indicative of a time history of a position of the controlled object, the apparatus comprising:

a storage storing a duration of a non-constant-velocity phase during which the target velocity of the controlled object varies with time; and an acceleration profile generator generating the acceleration profile, based on the duration of the non-constant-velocity phase stored in the storage, such that a portion of the acceleration profile which corresponds to the non-constant-velocity phase is generally curved.

This apparatus generates a portion of an acceleration profile of a controlled object which portion corresponds to a non-constant-velocity phase so as to be shaped generally as a curve, based on the duration of the non-constant-velocity phase. The generated acceleration profile is used for generating a target velocity profile and/or a target position profile of the controlled object. The controlled object may be controlled to achieve the generated target velocity profile and/or target position profile.

This apparatus therefore allows the controlled object to be controlled using the generated target velocity profile or target position profile, with the rate and/or magnitude of change of the jerk of the controlled object being reduced to be lower and/or smaller than when the target velocity profile and/or target position profile are alternatively generated using a conventional bang-bang control algorithm.

As a result, this apparatus allows the velocity and/or position of the controlled object to be controlled with improved accuracy for achieving a target velocity and/or position of the controlled object.

This apparatus may be practiced for driving the controlled object via a motor (i.e., one example of a drive mechanism or a drive source).

In this instance, the apparatus constructed according to the present mode (1) provides, for example, a reduction in a difference between the acceleration profile (i.e., the aforementioned current-command-value profile) of the controlled object and a torque profile (i.e., the aforementioned actual torque profile) of the motor, resulting in enhanced efficiency with which energy is utilized in the motor.

Moreover, this apparatus reduces an increase in a peak value of the current of the motor occurring at a starting instant of an acceleration phase, providing an advantageous effect that an increase in the load on a driver for the motor can be reduced.

In addition, the term "controlled object" may be interpreted to include at least a movable object (e.g., a moving object, a rotating object).

(2) The apparatus according to mode (1), wherein the acceleration profile generator includes a first generating section generating the acceleration profile, such that a portion of the acceleration profile which corresponds to the non-constant-velocity phase is shaped using a sine waveform.

This apparatus generates a portion of an acceleration profile which corresponds to a non-constant-velocity phase so as to be shaped using a sine waveform.

This apparatus therefore provides, for example, an advantageous effect that a generally-curved acceleration profile can be generated through simpler computation than when the same acceleration profile is alternatively shaped using a cosine waveform, although the apparatus constructed according to the previous mode (1) may be practiced such that the same acceleration profile is generated using a cosine waveform.

The reason is that, for example, when an acceleration profile is required to be shaped as generally a half-period of a sine waveform, if a cosine function defining a cosine waveform is employed, then an additional transformation is necessarily performed for the cosine function, requiring an additional mount of complexity and time of the computation.

(3) The apparatus according to mode (1), wherein the acceleration profile generator includes a second generating section generating the acceleration profile, such that a portion of the acceleration profile which corresponds to the non-constant-velocity phase is shaped as a half-period of a sine waveform.

This apparatus generates a portion of an acceleration profile which corresponds to a non-constant-velocity phase so as to be shaped using a half-period of a sine waveform, providing an advantageous effect that a generally-curved acceleration profile can be generated through far simpler computation.

(4) The apparatus according to any one of modes (1)-(3), wherein the non-constant-velocity phase includes a first non-constant-velocity portion and a second non-constant velocity portion which have no overlap in time therebetween, wherein the storage further stores a duration of a constant velocity phase which is interposed between the first and second non-constant-velocity portions and during which a target velocity of the controlled object is substantially constant; and wherein the acceleration profile generator includes a third generating section generating the acceleration profile, based on the duration of the constant velocity phase stored in the storage, such that a portion of the acceleration profile which corresponds to the constant-velocity phase exhibits zero acceleration.

This apparatus generates a portion of an acceleration which corresponds to a constant velocity phase so as to exhibit zero acceleration, based on the duration of the constant velocity phase, allowing incorporation of at least one constant velocity phase into the entire acceleration profile.

This apparatus therefore provides an advantageous effect that the same algorithm of generating an acceleration profile can apply, for example, even when an acceleration profile is required to achieve a long moving distance (including an angular displacement, etc.) of the controlled object.

The reason is that, for example, this apparatus generates an acceleration profile such that at least one constant-velocity phase portion is interposed between a leading acceleration-phase portion and a trailing deceleration-phase portion, wherein adjustment of the at least one constant-velocity phase portion in terms of its duration and/or its total number could produce a desired acceleration profile with reduced effort, because of the linearity between the duration and/or the total number and the resulting moving distance of the controlled object.

(5) The apparatus according to mode (4), wherein the storage further stores a velocity which the controlled object is desired to be achieved during the constant velocity phase, wherein the acceleration profile generator includes a fourth generating section generating a portion of the acceleration profile which corresponds to the non-constant-velocity phase, such that there are coincident with each other, a velocity calculated by integrating accelerations of the controlled object occurring in accordance with a portion of the acceleration profile which corresponds to the non-constant-velocity phase, over an integral interval equal to the duration of the non-constant velocity phase, and the velocity of the constant velocity phase stored in the storage, which velocity is desired to be achieved by the controlled object after the controlled object passes the non-constant-velocity phase.

This apparatus generate a portion of an acceleration profile which corresponds to a non-constant-velocity phase, such that a velocity calculated by integrating accelerations occurring according to the portion over an integral interval equal to the duration of the non-constant velocity phase, and the velocity of a constant velocity phase succeeding the non-constant-velocity phase, become coincident with each other.

This apparatus therefore provides an advantageous effect that there is allowed a smoothed transition from the preceding non-constant-velocity phase to the subsequent constant velocity phase.

(6) The apparatus according to mode (5), wherein the non-constant-velocity phase includes at least one non-constant-velocity portion, wherein the constant velocity phase includes at least one constant velocity portion, wherein the acceleration profile generator includes a fifth generating section generating the acceleration profile using the following equation:

$$a=(\pi(Ve-Vs)/2Ti)\sin((\pi/Ti)t),$$

where:

a is an acceleration of the controlled object;

Ve is an end speed of the controlled object for each of the at least one non-constant-velocity portion or each of the at least one constant velocity portion;

Vs is a start speed of the controlled object for each of the at least one non-constant-velocity portion or each of the at least one constant velocity portion;

Ti is a duration of each of the at least one non-constant-velocity portion or each of the at least one constant velocity portion; and t is an instant of time.

This apparatus generates an acceleration profile using an abbreviated equation for calculation, resulting in a reduction in complexity required for calculation of the acceleration profile.

(7) The apparatus according to any one of mode (1)-(6), wherein the non-constant-velocity phase includes at least one acceleration phase and at least one deceleration phase, and wherein the acceleration profile includes the at least one acceleration phase and the at least one deceleration phase, and at least one constant velocity phase disposed between adjacent two of the at least one acceleration phase and the at least one deceleration phase.

(8) The apparatus according to mode (7), wherein the acceleration profile includes at least one of a set of at least two acceleration phases, a set of at least two deceleration phases, and a set of at least two constant velocity phases.

This apparatus allows the acceleratory transition from zero to the top speed of the controlled object step by step, not at a stretch, resulting in smoothed acceleration, for example.

Further, this apparatus allows the deceleratory transition from the top speed of the controlled object to zero step by step, not at a stretch, resulting in smoothed deceleration, for example.

(9) The apparatus according to any one of modes (1)-(8), wherein the acceleration profile generator includes a modifier modifying a predefined reference waveform tunable in accordance with a plurality of tuning parameters, by specifying a value of each of the parameters, to thereby generate the acceleration profile.

(10) An apparatus for forming an image using a motion of a movable member, comprising:

an acceleration profile generator generating an acceleration profile indicative of a time history of an acceleration of the movable member, the acceleration profile being usable for generating a target velocity profile indicative of a time history of a target velocity of the movable member and a target position profile indicative of a time history of a target position of the movable member;

a target velocity profile generator generating the target velocity profile by integrating accelerations of the movable member occurring in accordance with the generated acceleration profile;

a target position profile generator generating the target position profile by integrating velocities of the movable member occurring in accordance with the generated target velocity profile;

a drive mechanism driving the movable member; and a controller controlling the drive mechanism, such that the generated target position profile and an actual position profile indicative of a time history of an actual position of the movable member become closer to each other, wherein the acceleration profile generator generates the acceleration profile, such that a portion of the acceleration profile which corresponds to the non-constant-velocity phase is generally curved.

Based on the same principle as described with regard to the previous mode (1), this apparatus constructed according to the present mode (10) allows the velocity and the position of the movable member to be controlled with improved accuracy for achieving the target velocity and position of the movable member.

This apparatus therefore provides, for example, a reduction in a difference between the acceleration profile (i.e., the aforementioned current-command-value profile) of the movable member or the drive mechanism and a torque profile (i.e., the aforementioned actual torque profile) or a force profile of the drive mechanism (e.g., in the form of a rotary or linear motor), resulting in enhanced efficiency with which energy is utilized in the drive mechanism.

Further, this apparatus provides a reduction in a peak value of the current of the drive mechanism (e.g., a motor) occurring at a starting instant of an acceleration phase, resulting in reduced load on a driver for the drive mechanism.

(11) The apparatus according to mode (10), wherein the image is formed on a recording medium, wherein the movable member includes a carriage reciprocally moved along a surface of the recording medium, and wherein the drive mechanism includes a motor driven for moving the carriage.

This apparatus provides, for example, a reduction in a difference between the acceleration profile (i.e., the aforementioned current-command-value profile) of the carriage or the motor and a torque profile (i.e., the aforementioned actual torque profile) or a force profile of the motor, resulting in enhanced efficiency with which energy is utilized in the motor.

(12) The apparatus according to mode (11), wherein the carriage has an ink-jet recording head which is mounted on the carriage, and is used to produce a relative motion between the ink-jet recording head and the recording medium.

(13) The apparatus according to mode (10), wherein the image is formed on a recording medium, wherein the movable member includes the recording medium, and wherein the drive mechanism include a motor driven for feeding the recording medium.

This apparatus provides, for example, a reduction in a difference between the acceleration profile (i.e., the aforementioned current-command-value profile) of the recording medium or the motor and a torque profile (i.e., the aforementioned actual torque profile) or a force profile of the motor, resulting in enhanced efficiency with which energy is utilized in the motor.

(14) A method of generating an acceleration profile indicative of a time history of an acceleration of a controlled object, to thereby generate at least one of a target velocity profile indicative of a time history of a target velocity of the controlled object and a target position profile indicative of a time history of a position of the controlled object, the method comprising:

a first storing step of storing in a storage, a duration of a non-constant-velocity phase during which the target velocity of the controlled object varies with time; and an acceleration profile generating step of generating the acceleration profile, based on the duration of the non-constant-velocity phase stored in the storage, such that a portion of the acceleration profile which corresponds to the non-constant-velocity phase is generally curved.

This method provides basically the same functions and effects as the apparatus constructed according to the above mode (1) provides, using basically the same principle as the apparatus utilizes.

(15) The method according to mode (14), wherein the acceleration profile generating step includes a first generating step of generating the acceleration profile, such that a portion of the acceleration profile which corresponds to the non-constant-velocity phase is shaped using a sine waveform.

This method provides basically the same functions and effects as the apparatus constructed according to the above mode (2) provides, using basically the same principle as the apparatus utilizes.

(16) The method according to mode (14), wherein the acceleration profile generating step includes a second generating step of generating the acceleration profile, such that a portion of the acceleration profile which corresponds to the non-constant-velocity phase is shaped as a half-period of a sine waveform.

This method provides basically the same functions and effects as the apparatus constructed according to the above mode (3) provides, using basically the same principle as the apparatus utilizes.

(17) The method according to any one of modes (14)-(16), wherein the non-constant-velocity phase includes a first non-constant-velocity portion and a second non-constant-velocity portion which have no overlap in time therebetween, the method further comprising:

a second storing step of storing in the storage, a duration of a constant velocity phase which is interposed between the first and second non-constant-velocity portions and during which a target velocity of the controlled object is substantially constant; and a third generating step of generating the acceleration profile, based on the duration of the constant velocity phase stored in the storage, such that a portion of the acceleration profile which corresponds to the constant velocity phase exhibits zero acceleration.

This method provides basically the same functions and effects as the apparatus constructed according to the above mode (4) provides, using basically the same principle as the apparatus utilizes.

(18) The method according to mode (17), further comprising a third storing step of storing in the storage, a velocity which the controlled object is desired to be achieved during the constant velocity phase, wherein the acceleration profile generating step includes a fourth generating step of generating a portion of the acceleration profile which corresponds to the non-constant-velocity phase, such that there are coincident with each other, a velocity calculated by integrating accelerations of the controlled object occurring in accordance with a portion of the acceleration profile which corresponds to the non-constant-velocity phase, over an integral interval equal to the duration of the non-constant velocity phase, and the velocity of the constant velocity phase stored in the storage, which velocity is desired to be achieved by the controlled object after the controlled object passes the non-constant-velocity phase.

This method provides basically the same functions and effects as the apparatus constructed according to the above mode (5) provides, using basically the same principle as the apparatus utilizes.

(19) The method according to mode (18), wherein the non-constant-velocity phase includes at least one non-constant-velocity portion, wherein the constant velocity phase includes at least one constant velocity portion, wherein the acceleration profile generating step includes a fifth generating step of generating the acceleration profile using the following equation:

$$a=(\pi(Ve-Vs)/2Ti)\sin((\pi/Ti)t),$$

where:

a is an acceleration of the controlled object;

Ve is an end speed of the controlled object for each of the at least one non-constant-velocity portion or each of the at least one constant velocity portion;

Vs is a start speed of the controlled object for each of the at least one non-constant-velocity portion or each of the at least one constant velocity portion;

Ti is a duration of each of the at least one non-constant-velocity portion or each of the at least one constant velocity portion; and t is an instant of time.

This method provides basically the same functions and effects as the apparatus constructed according to the above mode (6) provides, using basically the same principle as the apparatus utilizes.

(20) The method according to any one of modes (14)-(19), wherein the non-constant-velocity phase includes at least one acceleration phase and at least one deceleration phase, and wherein the acceleration profile includes the at least one acceleration phase and the at least one deceleration phase, and at least one constant velocity phase disposed between adjacent two of the at least one acceleration phase and the at least one deceleration phase.

This method provides basically the same functions and effects as the apparatus constructed according to the above mode (7) provides, using basically the same principle as the apparatus utilizes.

(21) The method according to mode (20), wherein the acceleration profile includes at least one of a set of at least two acceleration phases, a set of at least two deceleration phases, and a set of at least two constant velocity phases.

This method provides basically the same functions and effects as the apparatus constructed according to the above mode (8) provides, using basically the same principle as the apparatus utilizes.

(22) The method according to any one of modes (14)-(21), wherein the acceleration profile generating step includes a step of modifying a predefined reference waveform tunable in accordance with a plurality of tuning parameters, by specifying a value of each of the parameters, to thereby generate the acceleration profile.

This method provides basically the same functions and effects as the apparatus constructed according to the above mode (9) provides, using basically the same principle as the apparatus utilizes.

Several presently preferred embodiments of the invention will be described in more detail by reference to the drawings in which like numerals are used to indicate like elements throughout.

FIG. 1 is a functional block-diagram illustrating a servo-system mechanism 2 provided with an acceleration profile generator 1 constructed in accordance with an embodiment of the present invention.

The servo-system mechanism 2 includes: the acceleration profile generator 1; two integrators 3, 4 (i.e., first and second integrators); a position control circuit 5; a drive circuit 6; and a controlled-object device 7.

The acceleration profile generator 1, which is a device for generating an acceleration profile for use in generating a target position profile of a controlled object 7b, is provided with a parameter setter 1a and an acceleration profile calculator 1b.

The parameter setter 1a stores therein, as various parameters for use in generating the acceleration profile, a duration Ti of each of phases including an acceleration phase; a constant-velocity phase; and a deceleration phase, and a constant velocity Vi during the constant-velocity phase.

The acceleration profile calculator 1b generates the acceleration profile (a=f(N, Ti, V)) in accordance with the various parameters which have been stored in the parameter setter 1a. The generation of this acceleration profile (a=f(N, Ti, V)) to be generated will be described later.

The first integrator 3 generates a target velocity profile by integrating the acceleration profile generated by the acceleration profile generator 1, while the second integrator 4 generates the target position profile by integrating the target velocity profile generated by the first integrator 3.

The position control circuit 5 is a circuit for calculating the difference between the target position profile generated by the second integrator 4 and an actual-position profile of the controlled object 7b detected by an encoder system 7c described later, and for reducing an error between the target position profile and the actual-position profile of the controlled object 7b, to thereby move the controlled object 7b along the target position profile.

The controlled-object device 7 includes: a motor 7a; the controlled object 7b; and the encoder system 7c. The motor 7a acts as a drive source for driving the controlled object 7b. The controlled object 7b is an object to be driven for control by the motor 7a under control thereof. The encoder system 7c is a system for detecting the rotation of the motor 7a, to thereby output a position detection pulse of the controlled object 7b to the position control circuit 5.

With the servo-system mechanism 2 constructed in this manner, the target velocity profile and the target position profile are generated in accordance with the acceleration profile generated by the acceleration profile generator 1, and the controlled object 7b is feedback-controlled in accordance with the thus-generated target position profile, resulting in the control of the controlled object 7b along the target position profile.

Figure 2:
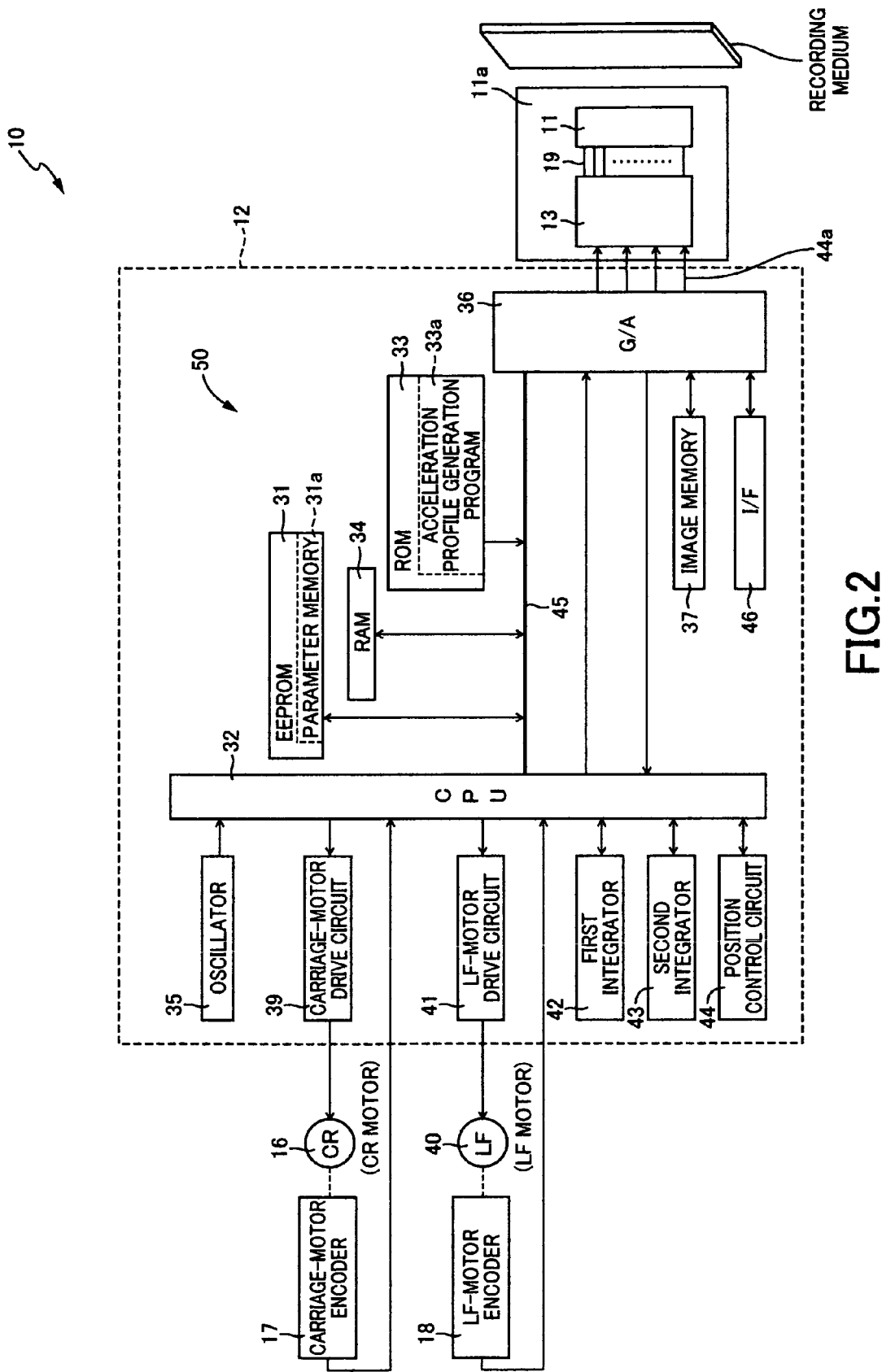
FIG. 2 is a block diagram illustrating the electrical configuration of an ink-jet recording device incorporating an acceleration profile generator constructed in accordance with one embodiment of the acceleration profile generator depicted in FIG. 1.

FIG. 2 is a block diagram illustrating the electrical configuration of an ink-jet recording device 10 which is provided with the acceleration profile generator 1 constructed in accordance with an embodiment of the acceleration profile generator 1. The ink-jet recording device 10 includes a head 11 for ejecting ink droplets onto a recording medium, and a carriage 11a reciprocally movable in a primary scanning direction, with the head 11 being mounted on the carriage 11a. The carriage 11a is position-controlled by the execution of an acceleration profile generation program 33a described later.

The ink-jet recording device 10 includes a body-side control board 12 mounted on a body of the ink-jet recording device 10, and a carriage-side board 13 mounted on the carriage 11a. The body-side control board 12 is provided principally with: a CPU 32; a Read Only Memory (ROM) 33; a Read Access Memory (RAM) 34; an Electrically Erasable Programmable Read Only Memory (EEPROM) 31; an image memory 37; and a Gate Array (G/A) 36.

As a result of the execution of a control program (not shown) which has been previously stored in the ROM 33, the CPU 32 is adapted to perform a print operation, and generate and then transfer timing and reset signals to the G/A 36. There are electrically coupled to the CPU 32, an oscillator 35; a carriage-motor drive circuit 39; an LF-motor drive circuit 41; a first integrator 42; a second integrator 43; a position control circuit 44; etc., each of these devices being operated under control of the CPU 32.

The oscillator 35 is adapted to output a clock signal repeatedly at constant periods. The carriage-motor drive circuit 39 is a circuit for driving the carriage motor (CR motor) 16 which allows the carriage 11a to move reciprocally.

To the carriage motor 16, a carriage-motor encoder 17 is electrically coupled for detecting the rotation of the carriage motor 16, which outputs a detection signal to be fed back to the CPU 32.

The LF-motor drive circuit 41 is a circuit for driving a Line Feed motor (LF motor) 40 for feeding a recording medium (e.g., a recording sheet). To the LF motor 40, a LF-motor encoder 18 is electrically coupled for detecting the rotation of the LF motor 40, which outputs a detection signal to be fed back to the CPU 32.

The first integrator 42 is adapted to generate the target velocity profile by integrating the acceleration profile generated by the execution of the acceleration profile generation program 33a described later. The second integrator 43 is adapted to generate the target position profile by integrating the target velocity profile generated by the first integrator 42.

The position control circuit 44 is a circuit for calculating the difference between the target position profile generated by the second integrator 43 and an actual-position profile of the carriage 11a detected by the carriage-motor encoder 17, and for reducing an error between the target position profile and the actual-position profile of the carriage 11a, to thereby move the carriage 11a along the target position profile.

The ROM 33 has stored therein the acceleration profile generation program 33a. The acceleration profile generation program 33a is a program for use in generating the acceleration profile of the carriage 11a, the execution of which allows an acceleration-profile generation process indicated in FIGS. 9 and 10 to be implemented.

To the EEPROM 31, a parameter memory 31a is assigned. The parameter memory 31a has stored therein, as the various parameters required for generating an acceleration profile, the duration Ti of each of phases including an acceleration phase; a constant-velocity phase; an intermediate transition phase; and a deceleration phase, and the constant velocity Vi during the constant-velocity phase.

The acceleration profile generation program 33a generates the acceleration profile based on the various parameters stored in the parameter memory 31a.

Based on both the timing signal transferred from the CPU 32 and image data stored in the image memory 37, the G/A 36 outputs: record data (a drive signal) for recording the image data onto a recording medium; a transfer clock synchronizing with the record data; a latch signal; a parameter signal for generating a wave-shaped fundamental-drive-signal; and an ink-ejection timing signal output repeatedly at constant periods. The G/A 36 transfers these signals to the carriage-side board 13 on which a head driver is mounted.

In addition, the G/A causes the image memory 37 to store therein image data transferred via a Centronics interface(I/F) 46 from an external device such as a computer. Then, the G/A 36 generates a Centronics-data-reception-interrupt signal, based on data for the Centronics I/F transferred via the I/F 44 from an external device such as a computer, and transfers the reception interrupt signal to the CPU 32.

The signals communicated between the G/A 36 and the carriage-side board 13 is transferred to the carriage-side board 13 via a harness cable 44a interconnecting the G/A 36 and the carriage-side board 13. In addition, the CPU 32, the ROM 33, the RAM 34, the EEPROM 31, and the G/A 36 are coupled to each other via a bus line 45.

The carriage-side board 13 is a board for driving the head 11 by the use of the head driver (a drive circuit), not shown, which is mounted on the carriage-side board 13.

The head 11 and the head driver are interconnected via a flexible wiring board 19 on which a copper film wiring pattern is formed on a polyimid film having a thickness of from 50 μm to 150 μm.

The head driver, which is controlled via the G/A 36 mounted on the body-side control board 12, is adapted to apply a drive pulse having a waveform conforming with a recording mode, to a piezoelectric actuator, not shown, which is mounted on the head 11. As a result, ink droplets are ejected through nozzles formed in and through the head 11 onto a recording medium.

Now, there will be described a correspondence between a plurality of elements illustrated in FIG. 1 and a plurality of elements illustrated in FIG. 2.

An example of the acceleration profile generator 1 illustrated in FIG. 1 corresponds to a computer 50 (of one-chip type, for example) constructed by: the EEPROM 31; the CPU 32; the ROM 33; the RAM 34; and the bus line 45, etc. all of which are illustrated in FIG. 2. Examples of the first integrator 3, the second integrator 4, and the position control circuit 5, all of which are illustrated in FIG. 1, correspond to the first integrator 42, the second integrator 43, and the position control circuit 44, respectively, all of which are illustrated in FIG. 2.

Further, examples of the drive circuit 6, the motor 7a, the controlled object 7b, and the encoder system 7c, all of which are illustrated in FIG. 1, correspond to the carriage-motor drive circuit 39, the carriage motor 16, the carriage 11a, and the carriage-motor encoder 17, respectively, all of which are illustrated in FIG. 2.

Figure 3:
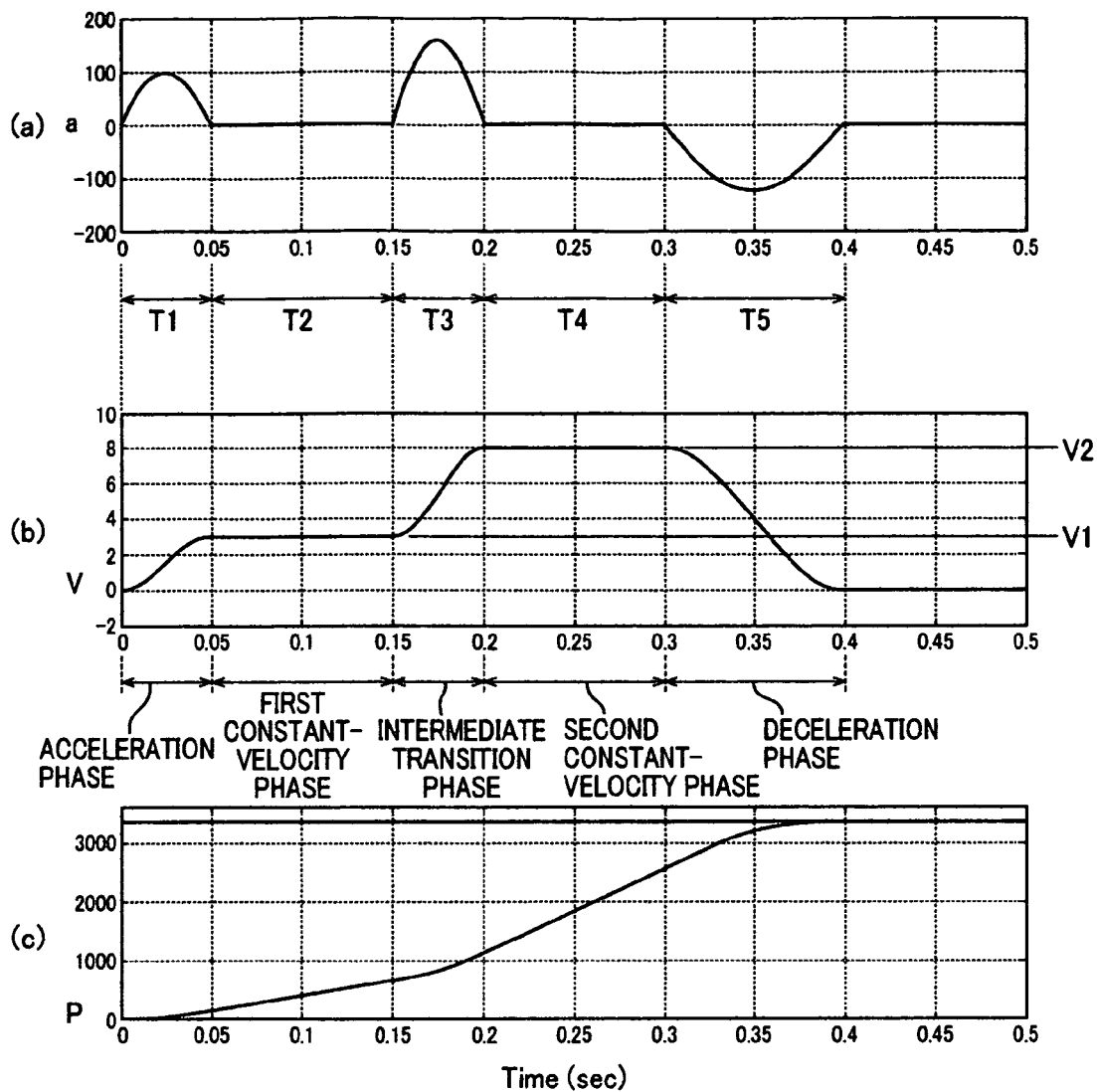
FIG. 3 illustrates in graph and table one of examples of an acceleration profile generated by the execution of an acceleration profile generation program indicated in FIG. 2.

Referring next to FIG. 3, there will be described the acceleration profile generated by the execution of the acceleration profile generation program 33a described above.

FIG. 3(a) depicts the acceleration profile indicative of a time history of the acceleration, and FIG. 3(b) depicts the target velocity profile indicative of a time history of a target velocity, which profile is generated based on the acceleration profile depicted in FIG. 3(a).

FIG. 3(c) depicts the target position profile indicative of a time history of the target position, which profile is generated based on the target velocity profile depicted in FIG. 3(b), and FIG. 3(d) represents a table which has been stored in the parameter memory 31a for use in the generation of the acceleration profile depicted in FIG. 3(a).

The table represented in FIG. 3(d) stores therein:
a duration T1 of an acceleration phase as data indicative of 50 msec;
a duration T2 of a first constant-velocity phase as data indicative of 100 msec;
a duration T3 of an intermediate transition phase as data indicative of 50 msec;
a duration T4 of a second constant-velocity phase as data indicative of 100 msec;
a duration T5 of a deceleration phase as data indicative of 100 msec;
a first constant velocity V1 of the first constant-velocity phase as data indicative of 3 inch/sec; and
a second constant velocity V2 of the second constant-velocity phase as data indicative of 8 inch/sec.

In this context, the acceleration profile depicted in FIG. 3(a) is generated by the execution of the acceleration profile generation program 33a using the parameters which have been stored in the table represented in FIG. 3(d). The target velocity profile depicted in FIG. 3(b) is generated by causing the first integrator 42 to integrate the acceleration profile depicted in FIG. 3(a). The target position profile depicted in FIG. 3(c) is generated by causing the second integrator 43 to integrate the target velocity profile depicted in FIG. 3(b).

As illustrated in FIG. 3(a), the acceleration profile is generated to form a series of the acceleration phase over the duration T1, the first constant-velocity phase over the duration T2, the intermediate transition phase over the duration T3, and the deceleration phase over the duration T5.

More specifically, the acceleration profile exhibits on a chart that plots accelerations over time, a series of a shape during the acceleration phase which is an upwardly-convex curve that transitions from zero and back to zero; a shape during the first constant-velocity phase for holding the acceleration at zero constantly; a shape during the intermediate transition phase which is an upwardly-convex curve that transitions from zero and back to zero; a shape during the second constant-velocity phase for holding the acceleration at zero constantly; and a shape during the deceleration phase which is a downwardly-convex curve that transitions from zero and back to zero.

More specifically, the acceleration profile depicted in FIG. 3(a) is generated based on the following equation (1):

$$a = (\pi(Ve - Vs)/2Ti)\sin((\pi/Ti)t) \qquad (1),$$

where:
a denotes an acceleration;
Ve denotes an end velocity for a corresponding one of the acceleration phases, the intermediate transition phase, the deceleration phase, and the several constant-velocity phases;
Vs denotes a start velocity for a corresponding one of the acceleration phases, the intermediate transition phase, the deceleration phase, and the several constant-velocity phases;
Ti denotes a duration of a corresponding one of the acceleration phases, the intermediate transition phase, the deceleration phase, and the several constant-velocity phases; and
t denotes an instant of time.

Now, there will be outlined the process of deriving equation (1).

First, the acceleration profile (indicative of a time history of acceleration "a"), which is used as a reference profile for generating the target velocity profile and the target position profile, is defined as the following equation (2):

$$a = A\sin(\omega t) \quad (2),$$

where:
A denotes an amplitude;
ω denotes an angular velocity; and
t denotes an instant of time.

In this regard, the target velocity profile (indicative of a time history of velocity "v") is expressed by the following equation (3) as a result of the integration of equation (2):

$$v = A/\omega(1-\cos(\omega t)) \quad (3).$$

In addition, the target position profile (indicative of a time history of position "p") is expressed by the following equation (4) as a result of the integration of equation (3):

$$p = A/\omega^2(\omega t - \sin(\omega t)) \quad (4).$$

Focusing now on only the acceleration phase, for achieving the acceleration phase in a half-period of a sine waveform, the fundamental sine waveform is required to have a full-period of 2T1 (T1: the duration of the acceleration phase), and then, angular velocity ω is expressed as the following equation (5), where "f" denotes the frequency:

$$\omega = 2\pi f = 2\pi/2T1 = \pi/T1 \quad (5).$$

Now, once the first constant velocity V1 during the first constant-velocity phase and equation (5) are substituted in equation (3) at t=T1, the following equation (6) is derived:

$$V1 = A/\omega(1-\cos(\omega t)) = T1A/\pi(1-\cos(\pi T1/T1)) = 2T1A/\pi \quad (6).$$

Equation (6) is written in the form of the following equation (7):

$$A = \pi V1/2T1 \quad (7).$$

Once equation (7) is substituted in equation (2), a portion of the acceleration profile which corresponds to the acceleration phase is expressed by the following equation (8):

$$a = (\pi V1/2T1)\sin((\pi/T1)t) \quad (8).$$

Because there can be derived in a similar manner the equations for defining individual portions of the acceleration profile which correspond to the transition phase and the deceleration phase, respectively, equation (1) is established to be a general equation for defining the acceleration profile over the entire time line.

That is to say, the acceleration profile depicted in FIG. 3(a) is shaped as a=30πsin(20πt) during the acceleration phase; a=0 during the first constant-velocity phase; a=50πsin(20πt) during the transition phase; a=0 during the second constant-velocity phase; and a=−40πsin(10πt) during the deceleration phase.

Individual portions of the thus-generated acceleration profile which correspond to several non-constant velocity phases (the acceleration phase, the intermediate transition phase, and the deceleration phase) each exhibit a smoother rise or a smoother fall than when the acceleration profile is generated in a square waveform. Therefore, this apparatus reduces an increase in a peak value of the current of the motor (e.g., the carriage motor 16) occurring at a starting instant of the non-constant velocity phase, providing an advantageous effect that an increase in the load on a driver for the motor can be reduced.

Further, the portion of the above-described acceleration profile which corresponds to the non-constant velocity phase is generated so as to be shaped as generally a half-period of a sine waveform, using a sine function defining a sine waveform. Alternatively, the same acceleration profile can be generated using a cosine function defining a cosine waveform, for example.

However, if the cosine function is employed, then the performance of a coordinate transformation (advancing the phase by π/2, for example) is additionally required for the cosine function.

Therefore, the present embodiment, because of the sine function being employed, provides an advantageous effect that the acceleration profile can be generated through simpler and higher-speed computation with reduced effort than when the acceleration profile is generated using the cosine function.

Additionally, for the above-described acceleration profile, the output of acceleration during the above-described constant-velocity phase is set to zero acceleration over the constant-velocity phase. This allows incorporation of at least one constant-velocity phase into the entire acceleration profile between its leading acceleration-phase and trailing deceleration-phase portions. Accordingly, the adjustment in term of a duration and/or the total number of a portion in which the carriage 11a is caused to move at a constant velocity could produce a desired acceleration profile with reduced effort, even when a target moving-distance of the carriage 11a is long.

In addition, the above-described acceleration profile is generated such that a non-constant-velocity phase portion and a constant-velocity phase portion are interconnected continuously.

Therefore, the above-described acceleration profile allows a smooth transition from a non-constant-velocity phase to a constant-velocity phase, and vice versa.

Figure 4:
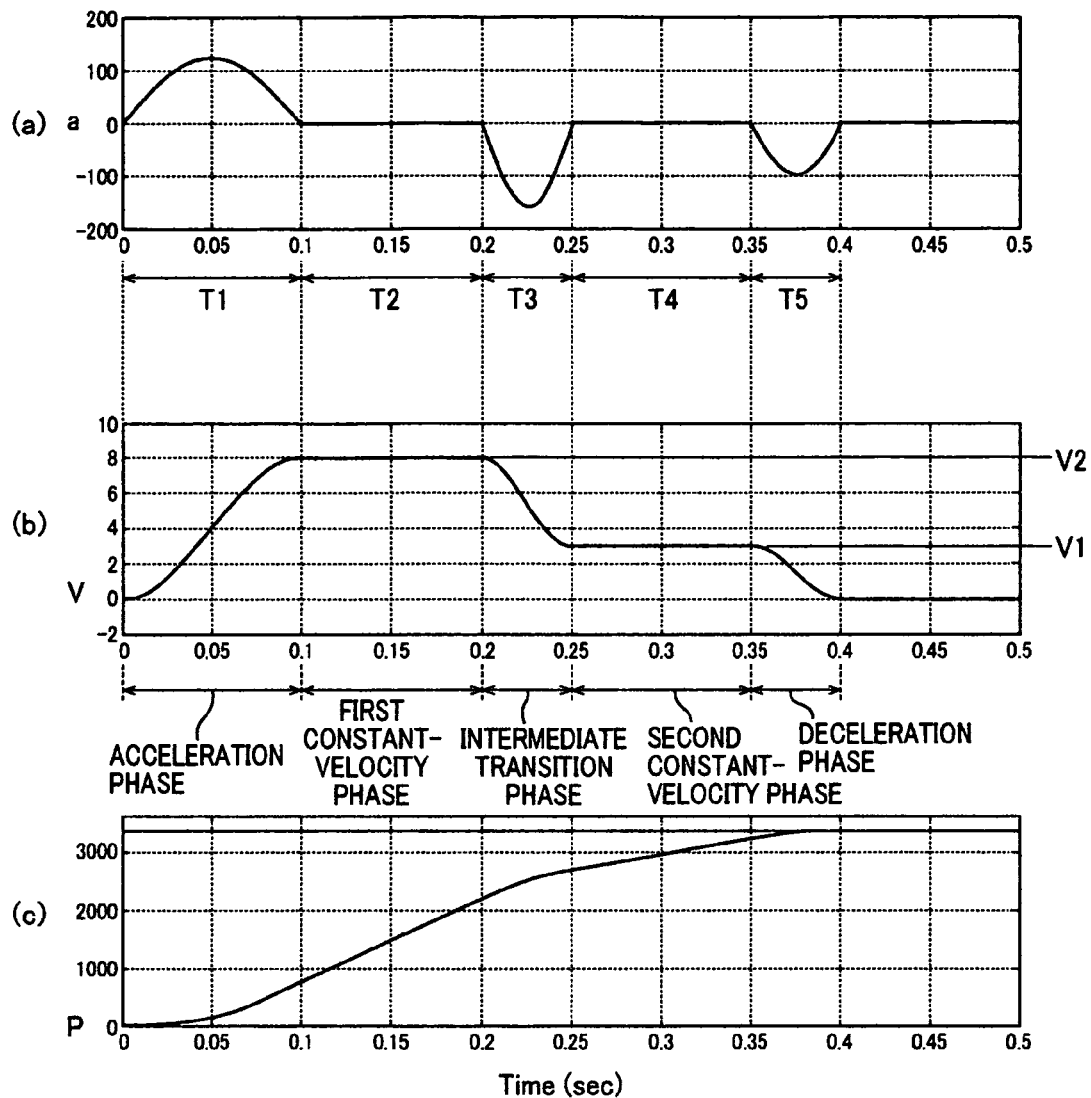
FIG. 4 illustrates in graph and table another example of an acceleration profile generated by the execution of the acceleration profile generation program indicated in FIG. 2.

Referring first to FIGS. 4 (a)-(d), there will be described one of the modifications of the acceleration profile described above with reference to FIGS. 3(a)-(d). There will be no redundant explanation for FIGS. 4(a)-(d) because of the graphical similarity with FIGS. 3(a)-(d).

A table represented in FIG. 4 (d) stores therein:
the duration T1 of an acceleration phase as data indicative of 100 msec;
the duration T2 of a first constant-velocity phase as data indicative of 100 msec;
the duration T3 of an intermediate transition phase as data indicative of 50 msec;
the duration T4 of a second constant-velocity phase as data indicative of 100 msec;
the duration T5 of a deceleration phase as data indicative of 50 msec;
the first constant velocity V1 of the first constant-velocity phase as data indicative of 8 inch/sec; and
the second constant velocity V2 of the second constant-velocity phase as data indicative of 3 inch/sec.

In this case, the acceleration profile depicted in FIG. 4(a) is shaped as a=40πsin(10πt) during the acceleration phase; a=0 during the first constant-velocity phase; a=−50πsin(20πt) during the transition phase; a=0 during the second constant-velocity phase; and a=−30πsin(20πt) during the deceleration phase.

Referring next to FIGS. 5(a)-(d), there will be described another modification of the acceleration profile described above with reference to FIGS. 3(a)-(d). There will be no redundant explanation for FIGS. 5(a)-(d) because of the graphical similarity with FIGS. 3(a)-(d).

A table represented in FIG. 5(d) stores therein:
the duration T1 of an acceleration phase as data indicative of 200 msec;
the duration T2 of a first constant-velocity phase as data indicative of 0 msec;

the duration T3 of an intermediate transition phase as data indicative of 0 msec;

the duration T4 of a second constant-velocity phase as data indicative of 0 msec;

the duration T5 of a deceleration phase as data indicative of 200 msec;

the first constant velocity V1 of the first constant-velocity phase as data indicative of 15 inch/sec; and the second constant velocity V2 of the second constant-velocity phase as data indicative of 0 inch/sec.

In this case, the acceleration profile depicted in FIG. 5(a) is shaped as a=75/2πsin(5πt) during the acceleration phase, and a=−75π/2πsin(5πt) during the deceleration phase.

Referring next to FIGS. 6(a)-(d), there will be described still another modification of the acceleration profile described above with reference to FIGS. 3(a)-(d). There will be no redundant explanation for FIGS. 6(a)-(d) because of the graphical similarity with FIGS. 3(a)-(d).

A table represented in FIG. 6(d) stores therein:

the duration T1 of an acceleration phase as data indicative of 100 msec;

the duration T2 of a first constant-velocity phase as data indicative of 0 msec;

the duration T3 of an intermediate transition phase as data indicative of 0 msec;

the duration T4 of a second constant-velocity phase as data indicative of 0 msec;

the duration T5 of a deceleration phase as data indicative of 300 msec;

the first constant velocity V1 of the first constant-velocity phase as data indicative of 15 inch/sec; and the second constant velocity V2 of the second constant-velocity phase as data indicative of 0 inch/sec.

In this case, the acceleration profile depicted in FIG. 6(a) is shaped as a=75πsin(10πt) during the acceleration phase, and a=−25πsin(10/3πt) during the deceleration phase.

Referring next to FIGS. 7(a)-(d), there will be described yet another modification of the acceleration profile described above with reference to FIGS. 3(a)-(d). There will be no redundant explanation for FIGS. 7(a)-(d) because of the graphical similarity with FIGS. 3(a)-(d).

A table represented in FIG. 7(d) stores therein:

the duration T1 of an acceleration phase as data indicative of 100 msec;

the duration T2 of a first constant-velocity phase as data indicative of 200 msec;

the duration T3 of an intermediate transition phase as data indicative of 0 msec;

the duration T4 of a second constant-velocity phase as data indicative of 0 msec;

the duration T5 of a deceleration phase as data indicative of 100 msec;

the first constant velocity V1 of the first constant-velocity phase as data indicative of 8 inch/sec; and the second constant velocity V2 of the second constant-velocity phase as data indicative of 0 inch/sec.

In this case, the acceleration profile depicted in FIG. 7(a) is shaped as a=40πsin(10πt) during the acceleration phase; a=0 during the first constant-velocity phase; and a=−40πsin(10πt) during the deceleration phase.

Referring next to FIGS. 8(a)-(d), there will be described additional modification of the acceleration profile described above with reference to FIGS. 3(a)-(d). There will be no redundant explanation for FIGS. 8(a)-(d) because of the graphical similarity with FIGS. 3(a)-(d).

A table represented in FIG. 8(d) stores therein:

the duration T1 of an acceleration phase as data indicative of 50 msec;

the duration T2 of a first constant-velocity phase as data indicative of 50 msec;

the duration T3 of a first intermediate transition phase as data indicative of 100 msec;

the duration T4 of a second constant-velocity phase as data indicative of 50 msec;

the duration T5 of a second intermediate transition phase as data indicative of 50 msec;

a duration T6 of a third constant-velocity phase as data indicative of 50 msec;

a duration T7 of a deceleration phase as data indicative of 50 msec;

the first constant velocity V1 of the first constant-velocity phase as data indicative of 3 inch/sec;

the second constant velocity V2 of the second constant-velocity phase as data indicative of 10 inch/sec; and a third constant velocity V3 of a third constant-velocity phase as data indicative of 5 inch/sec.

In this case, the acceleration profile depicted in FIG. 8(a) is shaped as a=30πsin(20πt) during the acceleration phase; a =0 during the first constant-velocity phase; a=35πsin(10πt) during the first intermediate transition phase; a=0 during the second constant-velocity phase; a=−50πsin(20πt) during the second intermediate transition phase; a=0 during the third constant-velocity phase; and a=−50πsin(20πt) during the deceleration phase.

Figure 9:
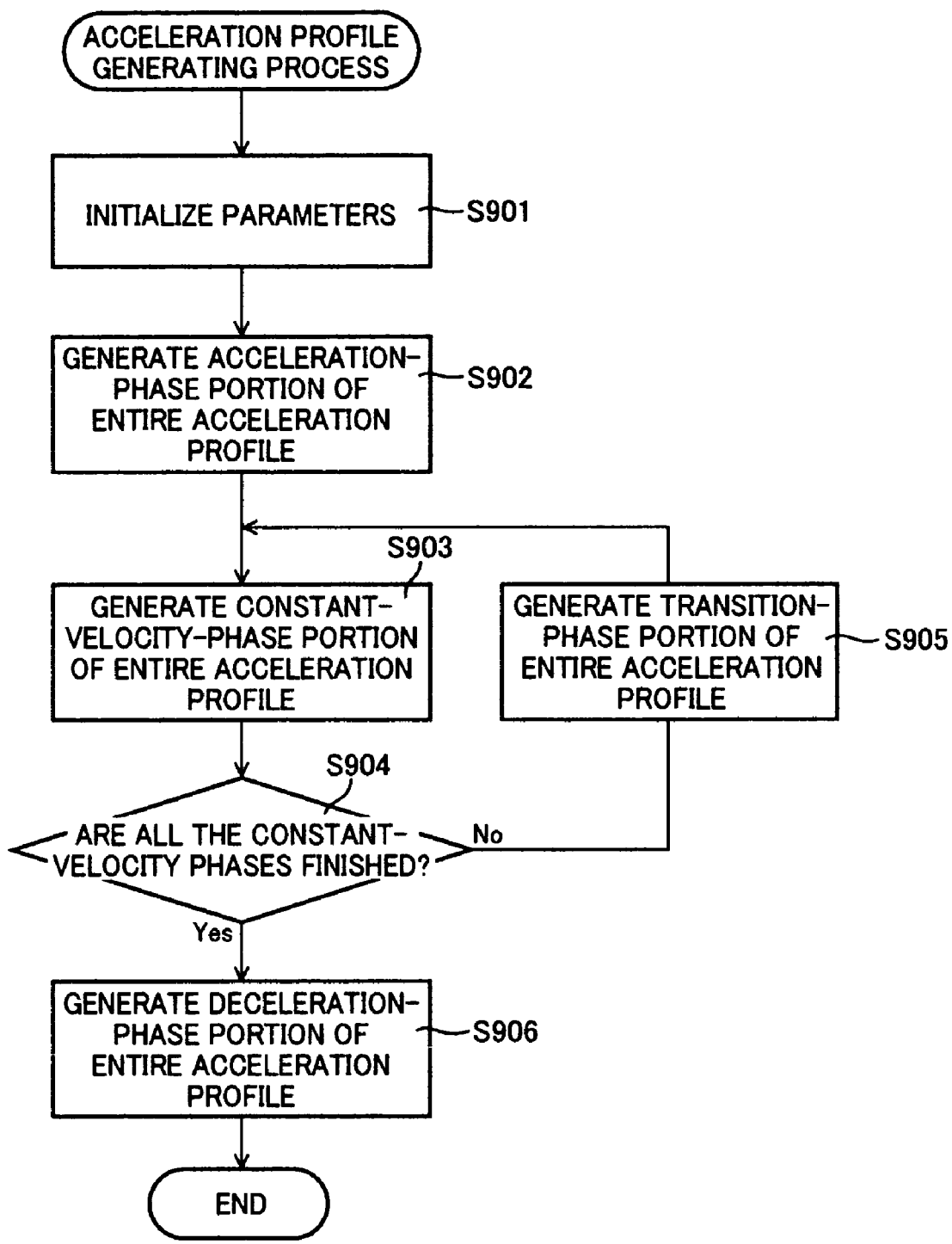
FIG. 9 is a flow chart conceptually illustrating an acceleration-profile generation process carried out by the execution of the acceleration profile generation program indicated in FIG. 2.

Referring next to FIG. 9, there will be schematically described the acceleration-profile generation process implemented in accordance with the acceleration profile generation program 33a described above. FIG. 9 is a flow chart illustrating the acceleration-profile generation process.

Once the acceleration-profile generation process is initiated, a step S901 is first implemented for initializing the parameters. Subsequently, a step S902 is implemented to generate a portion of the acceleration profile which corresponds to the acceleration phase.

Thereafter, a step S903 is implemented to generate portions of the acceleration profile which corresponds to constant-velocity phases, respectively. A step S904 follows to determine whether or not the generation of the acceleration profile has been completed for all the constant-velocity phases. If not, then the determination of the step S904 becomes negative "NO." A step S905 follows to generate a portion of the acceleration profile which corresponds to a transition phase. Then, the process returns to the step S903.

On the other hand, if the generation of the acceleration profile had been already completed for all the constant-velocity phases when at the step S904 was last implemented, then the determination of the step S904 becomes affirmative "YES." A step S906 follows to generate a portion of the acceleration profile which corresponds to a deceleration phase.

Then, one cycle of the implementation of this acceleration-profile generation process is terminated.

Figure 10:
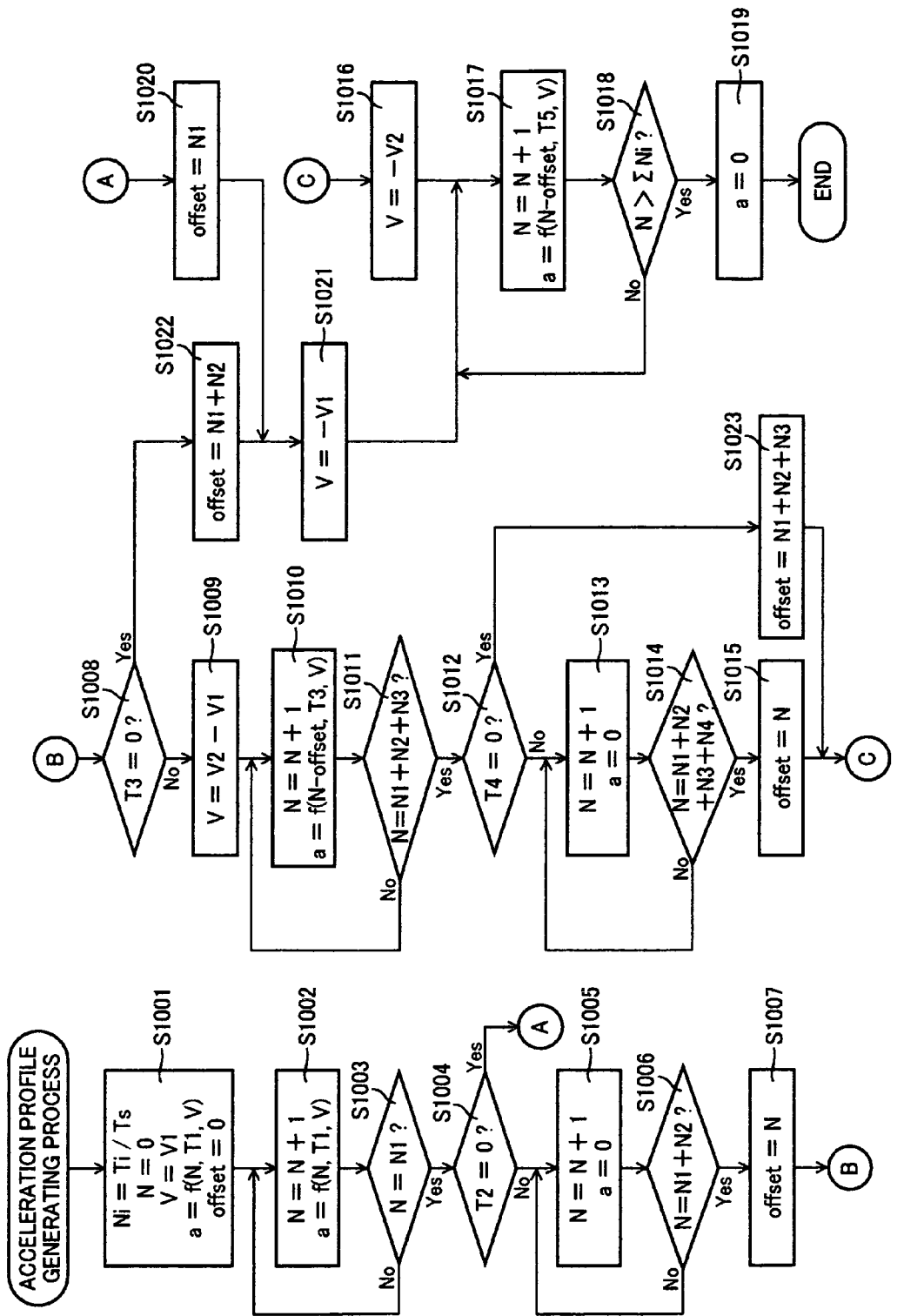
FIG. 10 is a flow chart for illustrating the acceleration-profile generation process in greater detail.

Referring next to FIG. 10, there will be described more specifically the acceleration-profile generation process implemented in accordance with the acceleration profile generation program 33a described above. FIG. 10 is a flow chart conceptually illustrating the acceleration-profile generation process.

It is noted that the acceleration-profile generation process will be described by referring to FIG. 10 by way of a representative example where there are given as the parameters: the duration T1 of the acceleration phase; the duration T2 of the first constant-velocity phase; the duration T3 of the intermediate transition phase; the duration T4 of the second constant-velocity phase; the duration T5 of the deceleration phase; the first constant velocity V1 of the first constant-velocity phase; and the second constant velocity V2 of the second constant-velocity phase, and where an end velocity of the deceleration phase is set to zero.

Once the acceleration-profile generation process is initiated, steps S1001 to S1003 are first implemented to generate a portion of the acceleration profile which corresponds to the acceleration phase. More specifically, accelerations "a" are calculated so as to have the same number as a target sample count Ni ("i" is a varying integer, and, for the acceleration phase, the "i" becomes "1") occurring during the duration T1 of the acceleration phase, to thereby generate or define a portion of the acceleration profile which corresponds to the acceleration phase.

More specifically, the step S1001 is first implemented to establish a value of the target sample count Ni of the accelerations "a." The target sample count Ni is set by Ti/Ts. Ti denotes the durations of each of phases including the acceleration phase (i=1); the intermediate transition phase (i=2); the deceleration phase (i=3); and the constant-velocity phase (i=4). Ts denotes a sampling period.

As a result, the calculation of Ni=Ti/Ts allows the setting of the target sample count Ni of the accelerations "a" occurring during the duration Ti of each phase.

It is added that, provided that Ve−Vs=V (a velocity difference), the above-described general equation for the acceleration profile: $a=(\pi(Ve-Vs)/2Ti)\sin((\pi/Ti)t)$ is expressed as an abbreviated equation: $a=f(N, Ti, V)$.

Here, the "t" in the general equation is calculated as a product of the "N" in the above-described abbreviated equation, that is, an increasing value (hereinafter, referred to as "count N") of an actual sample count of the accelerations "a," and the sampling period "Ts."

Then, the step S1001 is further implemented to set a current value of the count N to an initial value (=0), set a current value of the duration Ti to the duration T1 of the acceleration phase, and set a current value of the velocity difference V as V=0−V1=V1.

Subsequently, the step S1001 is still further implemented to substitute N=0, Ti=T1, and V=V1, in the above-described abbreviated equation $a=f(N, Ti, V)$. Additionally, an offset, which is described later, is set to zero.

The step S1001 is followed by a step S1002 to increment the count N by "1" and to calculate a current value of the acceleration "a" using the above-described abbreviated equation with the incremented count N.

Thereafter, the step S1003 is implemented to determine whether or not the current value of the count N has reached the target sample count N1 for the acceleration phase. If not, then the determination of the step S1003 becomes negative "NO," and this process returns to the step S1002.

The implementation of the steps S1002 and S1003 is repeated until the determination of the step S1003 becomes affirmative "YES," resulting in the generation of a portion of the acceleration profile which corresponds to the acceleration phase (in the form of a succession of the accelerations "a" having the same number as the target sample count N1).

If the determination of the step S1003 becomes affirmative "YES" resulting from the current value of the count N reaching the target sample count N1, then steps S1004 to S1006 are implemented to generate a portion of the acceleration profile which corresponds to the first constant-velocity phase.

More specifically, the step S1004 is first implemented to determine whether or not the duration T2 of the first constant-velocity phase is equal to zero. If not, then the determination of the step S1004 becomes negative "NO."

Because the negative determination of the step S1004 means the presence of a constant-velocity phase, the step S1004 is followed by a step S1005 to increment the count N by "1" and set a current value of the acceleration "a" to zero.

Thereafter, the step S1006 is implemented to determine whether or not a current value of the count N has reached a sum of the target sample count N1 for the acceleration phase and the target sample count N2 for the first constant-velocity phase. If not, then the determination of the step S1006 becomes negative "NO," and this process returns to the step S1005.

The implementation of the steps S1005 and S1006 is repeated until the determination of the step S1006 becomes affirmative "YES," to thereby generate a portion of the acceleration profile which corresponds to the first constant-velocity phase (in the form of a succession of the accelerations "a" having the same number as the target sample count N2).

Subsequently, the implementation of steps S1007 to S1011 allows the generation of a portion of the acceleration profile which corresponds to the intermediate transition phase.

More specifically, the step S1007 is first implemented to set a current value of the offset to a current value (=N1+N2) of the count N.

The offsetting of the count N by the offset allows a start position of a portion of the acceleration profile (a sine waveform) which corresponds to the intermediate transition phase, to be set to zero, with regard to the phase of a sine waveform in the general equation. Therefore, a portion of the acceleration profile which corresponds to the intermediate transition phase can be generated so as to be graphically continuous with the first constant-velocity phase preceding the intermediate transition phase.

Thereafter, a step S1008 is implemented to determine whether or not the duration T3 of the intermediate transition phase is equal to zero. If not, then the determination of the step S1008 becomes negative "NO."

Because the negative determination of the step S1008 means the presence of an intermediate transition phase, the step S1008 is followed by a step S1009 to subtract the first constant velocity V1 from the second constant velocity V2, to thereby calculate a current value of the velocity difference V as "V=V2−V1."

The first constant velocity V1 denotes a velocity during the first constant-velocity phase preceding the intermediate transition phase, while the second constant velocity V2 denotes a velocity during the second constant-velocity phase following the intermediate transition phase.

Then, the step S1009 is followed by a step S1010 to increment the count N by "1" and to offset the incremented count N by the current value of the offset.

The step S1010 is further implemented to substitute: the post-offset count N=N−offset; Ti=T3; and V=V2−V1, in the above-described abbreviated equation $a=f(N, Ti, V)$, to thereby calculate a current value of the acceleration "a."

Thereafter, the step S1011 is implemented to determine whether or not a current value of the count N has reached a sum of the target sample count N1 for the acceleration phase, the target sample count N2 for the first constant-velocity phase, and the target sample count N3 for the intermediate transition phase. If not, then the determination of the step S1011 becomes negative "NO," and this process returns to the step S1010.

The implementation of the steps S1010 and S1011 is repeated until the determination of the step S1011 becomes affirmative "YES," to thereby generate a portion of the acceleration profile which corresponds to the intermediate transition phase (in the form of a succession of the accelerations "a" having the same number as the target sample count N3).

Subsequent implementation of steps S1012 to S1014 allows the generation of a portion of the acceleration profile which corresponds to the second constant-velocity phase.

More specifically, the step S1012 is first implemented to determine whether or not the duration T4 of the second constant velocity phase is equal to zero. If not, then the determination of the step S1012 becomes negative "NO."

Because the negative determination of the step S1012 means the presence of a second constant-velocity phase, the step S1012 is followed by a step S1013 to increment the count N by "1" and set a current value of the acceleration "a" to zero.

Thereafter, a step S1014 is implemented to determine whether or not a current value of the count N has reached a sum of the target sample count N1 for the acceleration phase, the target sample count N2 for the first constant-velocity phase, the target sample count N3 for the intermediate transition phase, and the target sample count N4 for the second constant-velocity phase. If not, then the determination of the step S1014 becomes negative "NO," and this process returns to the step S1013.

The implementation of the steps S1013 and S1014 is repeated until the determination of the step S1014 becomes affirmative "YES," to thereby generate a portion of the acceleration profile which corresponds to the second constant-velocity phase (in the form of a succession of the accelerations "a" having the same number as the target sample count N4).

Subsequent implementation of steps S1015 to S1018 allows the generation of a portion of the acceleration profile which corresponds to the deceleration phase.

More specifically, the step S1015 is first implemented to set a current value of the offset to a current value of the count N(=N1+N2+N3+N4). The step S1015 is followed by a step S1016 to subtract the second constant velocity V2 during the second constant velocity phase which precedes the deceleration phase, from the end velocity (=0) for the deceleration phase, to thereby calculate a current value of the velocity difference V as "V=−V2."

Then, the step S1016 is followed by a step S1017 to increment the current value of the count N by "1" and offset the incremented count N by the current value of the offset.

The step S1017 is further implemented to substitute: the post-offset count N=N−offset; Ti=T5; and V=−V2, in the above-described abbreviated equation a=f(N, Ti, V), to thereby generate a current value of the acceleration "a."

Thereafter, a step S1018 is implemented to determine whether or not a current value of the count N has reached a sum of the target sample count N1 for the acceleration phase, the target sample count N2 for the first constant-velocity phase, the target sample count N3 for the intermediate transition phase, and the target sample count N4 for the deceleration phase. If not, then the determination of the step S1018 becomes negative "NO," and this process returns to the step S1017.

The implementation of the steps S1017 and S1018 is repeated until the determination of the step S1018 becomes affirmative "YES," to thereby generate a portion of the acceleration profile which corresponds to the deceleration phase (in the form of a succession of the accelerations "a" having the same number as the target sample count N4).

Thereafter, a step S1019 is implemented to set an ultimate value of the acceleration "a" to zero.

The implementation of the above-described process results in the generation of an acceleration profile of a type having a shape of a waveform depicted in FIG. 3 or 4.

On the other hand, if the duration T2 of the first constant-velocity phase is equal to zero, then the determination of the step S1004 becomes affirmative "YES."

Because the affirmative determination of the step S1004 means the absence of a first constant-velocity phase, the step S1004 is followed by a step S1020 to set the current value of the offset to the current value of the count N (=N1).

Thereafter, a step S1021 is implemented to subtract the first constant velocity V1 from the end velocity Ve (=0) for the acceleration phase, to thereby calculate a current value of the velocity difference V as "V=−V1." The step S1017 follows to generate a portion of the acceleration profile which corresponds to the deceleration phase.

Figure 5:
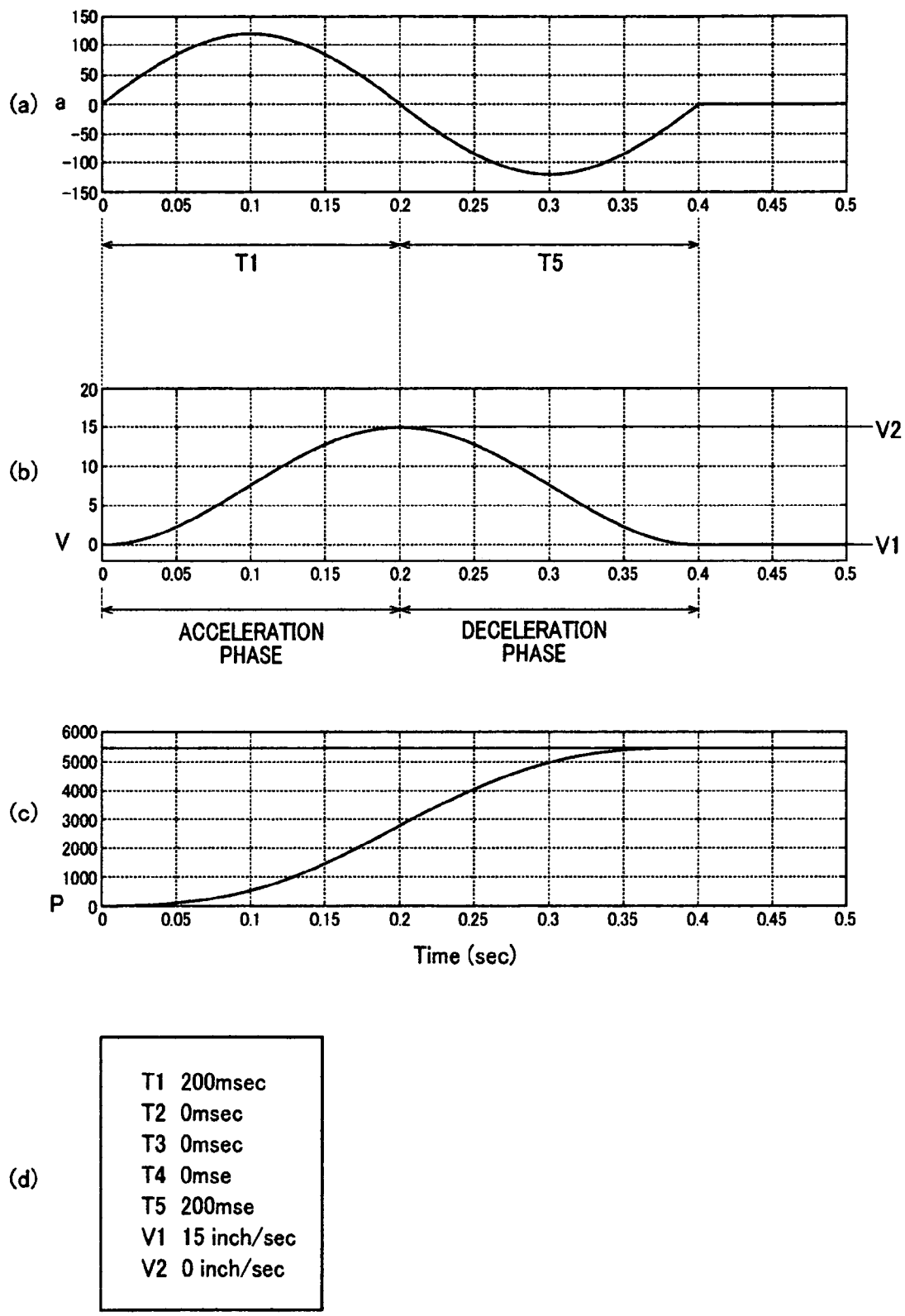
FIG. 5 illustrates in graph and table still another example of an acceleration profile generated by the execution of the acceleration profile generation program indicated in FIG. 2.
Figure 6:
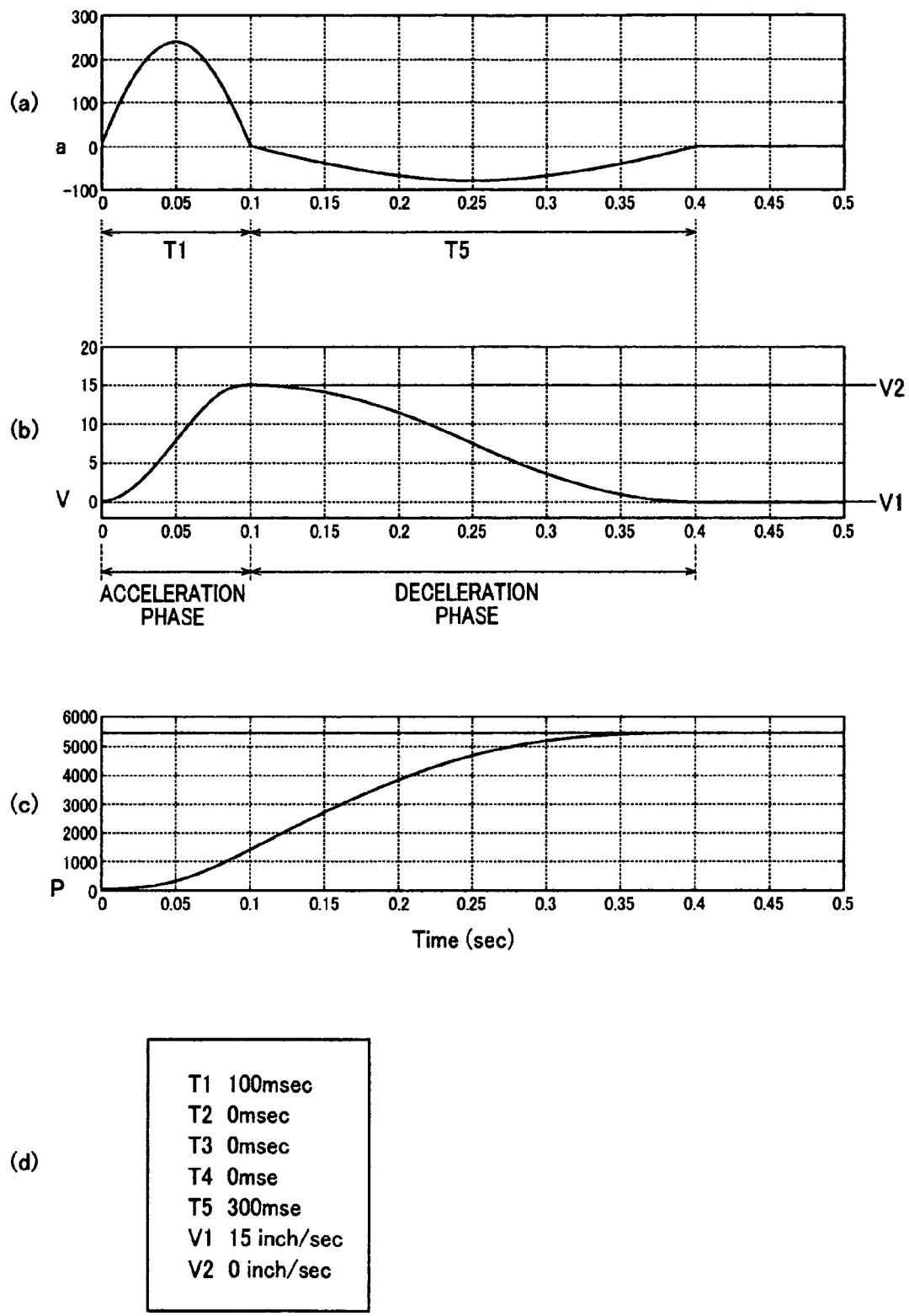
FIG. 6 illustrates in graph and table yet another example of an acceleration profile generated by the execution of the acceleration profile generation program indicated in FIG. 2.

The implementation results in the generation of an acceleration profile of a type having a shape of a waveform depicted in FIG. 5 or 6.

On the other hand, if the duration T3 of the intermediate transition phase is equal to zero, then the determination of the step S1008 becomes affirmative "YES."

Because the affirmative determination of the step S1008 means the absence of an intermediate transition phase, the step S1008 is followed by a step S1022 to set the current value of the offset to the current value of the count N(=N1+N2). Following the step S1021, the step S1017 is implemented to generate a portion of the acceleration profile which corresponds to the deceleration phase.

Figure 7:
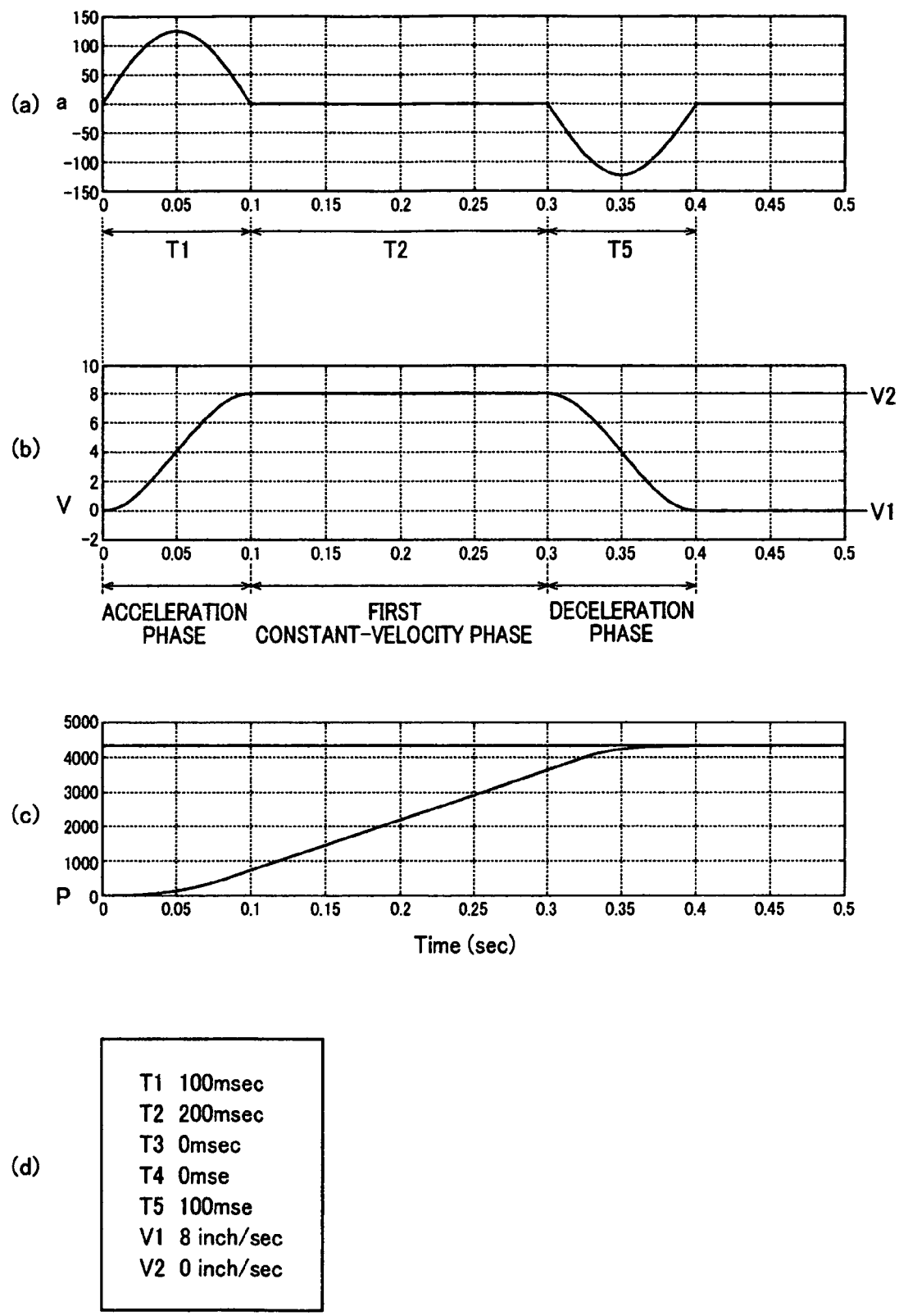
FIG. 7 illustrates in graph and table additional example of an acceleration profile generated by the execution of the acceleration profile generation program indicated in FIG. 2.

The implementation results in the generation of an acceleration profile of a type having a shape of a waveform depicted in FIG. 7.

On the other hand, if the duration T4 of the second constant-velocity phase is equal to zero, then the determination of the step S1012 becomes affirmative "YES."

Because the affirmative determination of the step S1012 means the absence of a second constant-velocity phase, the step S1012 is followed by a step S1023 to set the current value of the offset to the current value of the count N(=N1+N2+N3). Following the step S1016, the step S1017 is implemented to generate a portion of the acceleration profile which corresponds to the deceleration phase.

Figure 8:
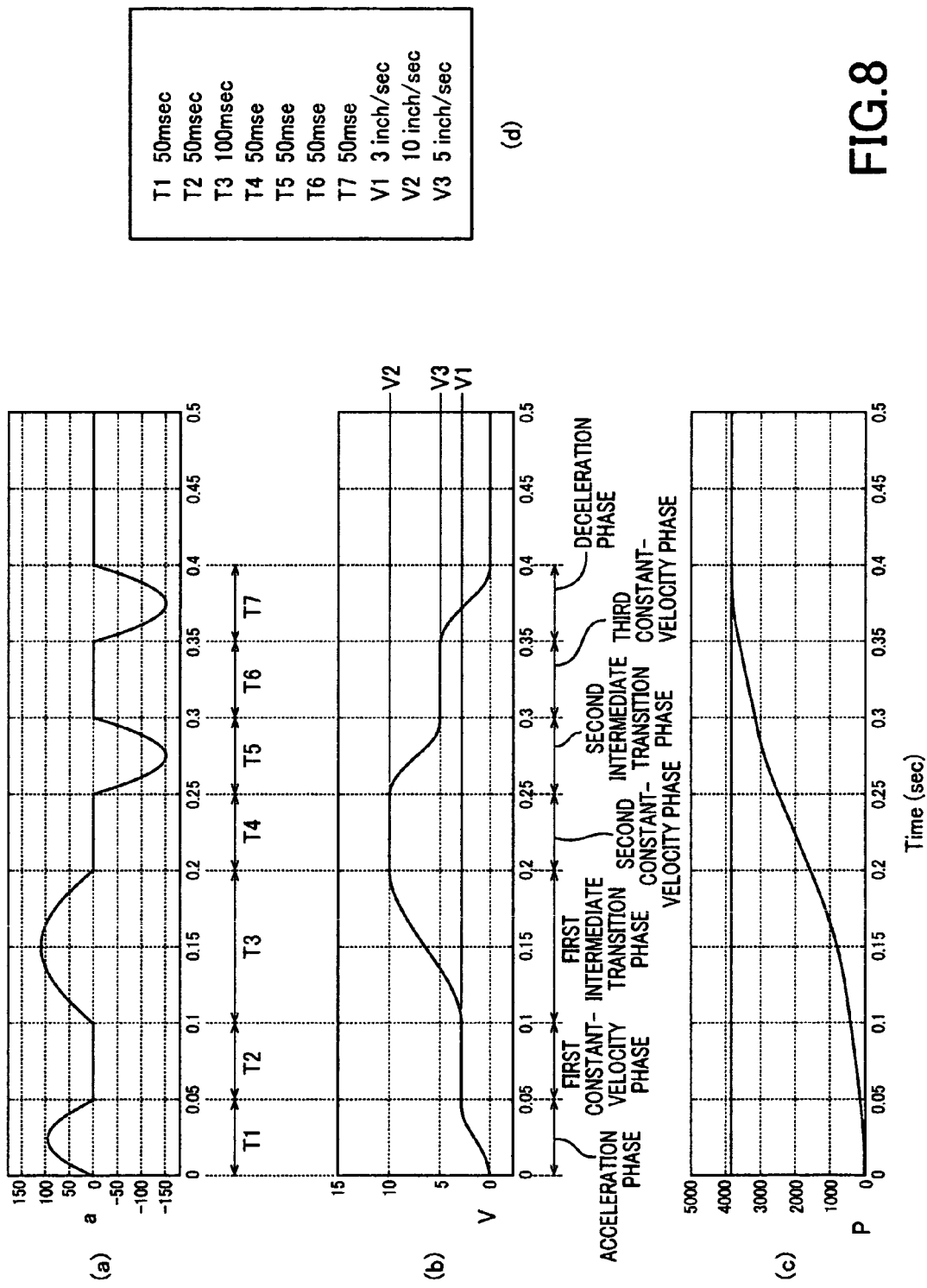
FIG. 8 illustrates in graph and table still additionally example of an acceleration profile generated by the execution of the acceleration profile generation program indicated in FIG. 2.

It is added that, even if the program exemplarily illustrated in FIG. 10 in flow chart were executed faithful to the flow chart, the acceleration profile of a type having a shape of a waveform depicted in FIG. 8, for example, cannot be achieved.

However, such a type of acceleration profile can be achieved, for example, by implementing again a group of the step S1008 and the following steps, after the completion of the step S1015.

Figure 11:
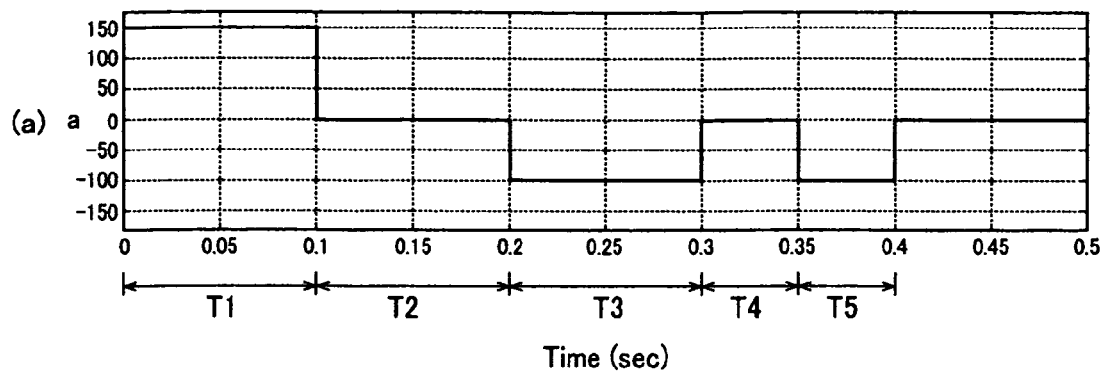
FIG. 11 illustrates in graph and table advantageous effects provided by the embodiment illustrated in FIG. 2.
Figure 11:
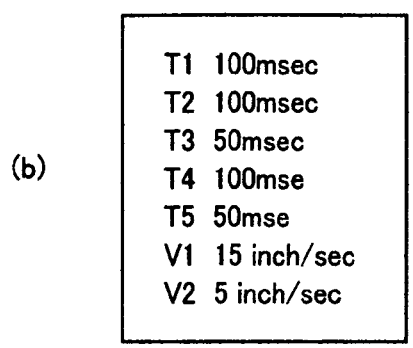
Figure 11:
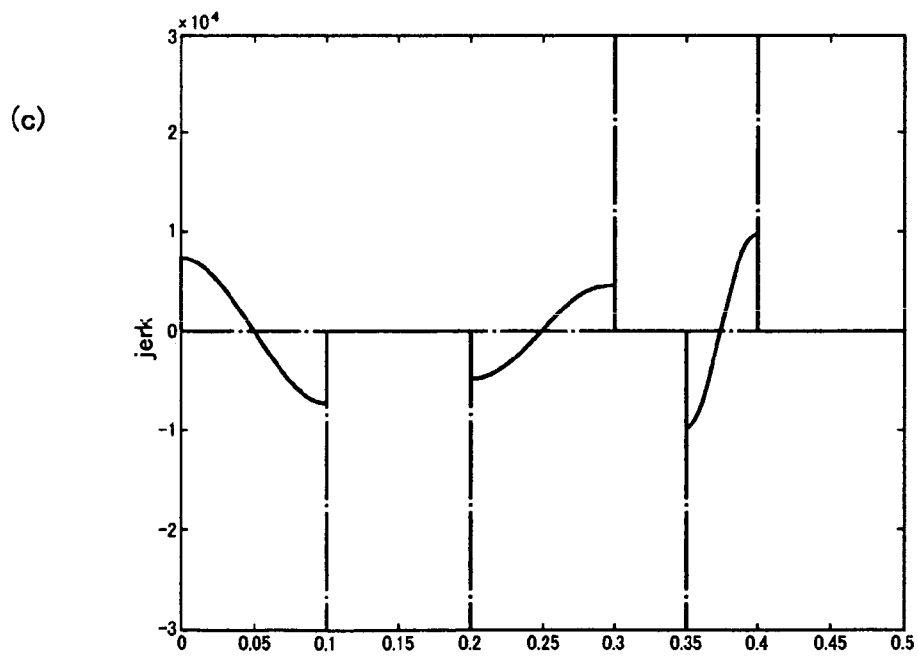
Figure 12:
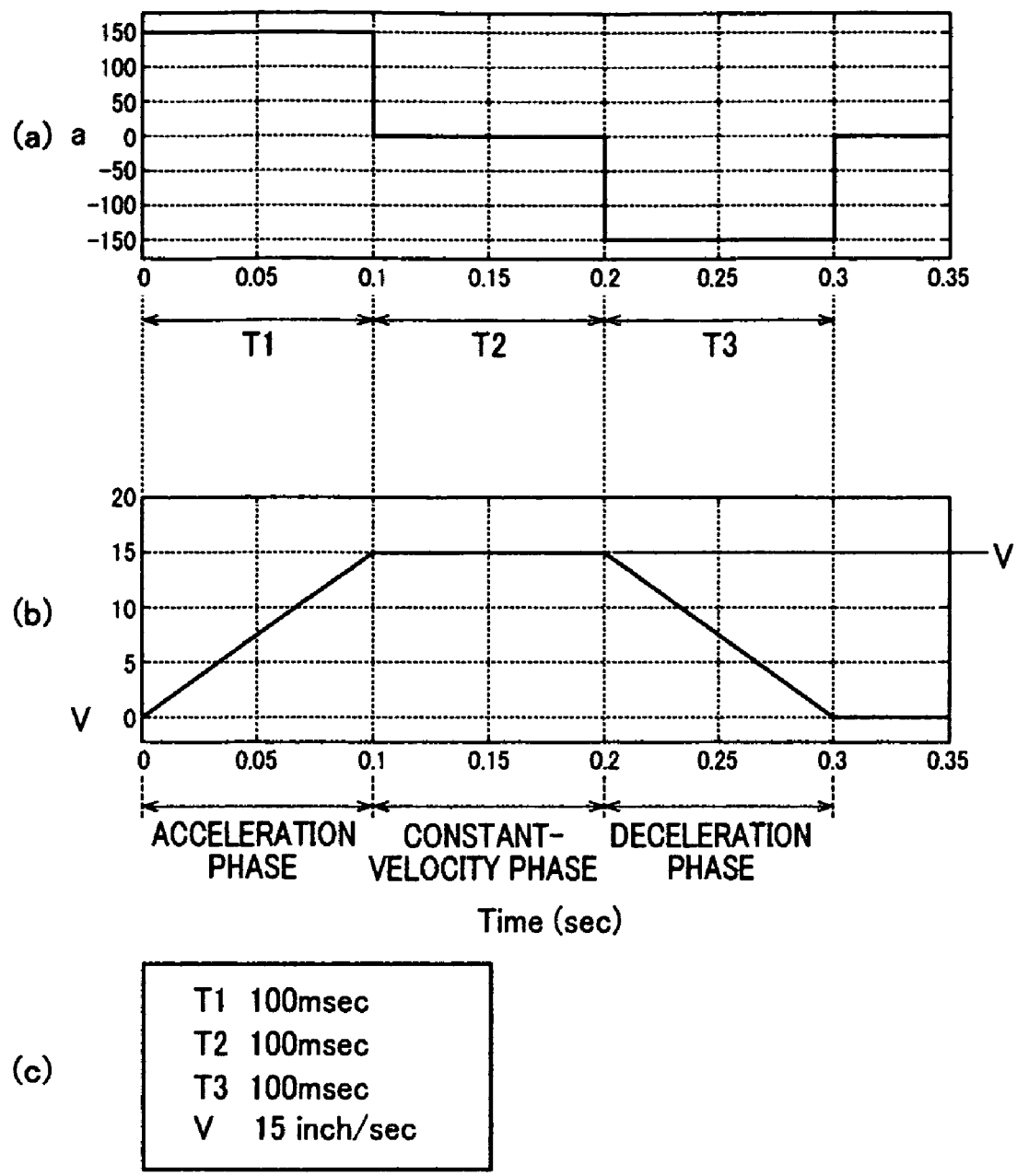
FIG. 12 illustrates in graph and table the generation of a target velocity profile of a controlled object by the use of a conventional bang-bang control algorithm.

Referring next to FIG. 11, there will be described the advantageous effects provided by generating an acceleration profile using the acceleration profile generator 1 constructed in accordance with the present embodiment.

FIG. 11(a) is a graph illustrating an acceleration profile shaped as a pure square or rectangular waveform, and FIG. 11(b) represents a table storing therein the parameters.

FIG. 11(c) is a combined graph in the form of a superposition of a dot-dash-line graph depicting a time history of the jerk for the acceleration profile shaped as the pure rectangular waveform depicted in FIG. 11(a), and a solid-line graph depicting a time history of the jerk for an acceleration profile (a=($\pi$(Ve−Vs)/2Ti)sin(($\pi$/Ti)t)) generated using the table represented in FIG. 11(b) by means of the acceleration profile generator 1 constructed in accordance with the present embodiment.

In the present embodiment, an acceleration profile such as depicted in FIG. 4(a) is created from the parameters stored in the table illustrated in FIG. 11(b). The use of the same table could provide an alternative acceleration profile shaped as a pure square waveform, as with a conventional bang-bang control algorithm.

However, it is evident from a comparison between the dot-dash-line graph of FIG. 11(c) indicative of a time history of the jerk calculated from the pure-square-waveform acceleration profile, and the solid-line graph of FIG. 11(c) indicative of a time history of the jerk calculated from the acceleration profile which is generated by the acceleration profile generator 1 according to the present embodiment, that the rate and magnitude of change of the jerk calculated from the pure-square-waveform acceleration profile are higher and greater than those of the counterpart.

For the above reasons, when an acceleration profile is generated in the form of a pure square waveform, as with a conventional bang-bang-control scheme, undesired vibration is caused in the carriage 11a which is an example of a controlled object, resulting in the increased difficulty of accurately controlling a target velocity and/or a target position of the controlled object.

In contrast, the use of an acceleration profile generated by the acceleration profile generator 1 according to the present embodiment increases the ease of accurately controlling a target velocity and/or a target position of the controlled object because of a lower rate of change and a smaller magnitude of the jerk of the acceleration profile generated.

Further, the use of an acceleration profile generated by the acceleration profile generator 1 according to the present embodiment improves the efficient utilization of energy in the carriage motor 16 because of a reduced difference generated between the acceleration profile generated (i.e., the aforementioned current-command-value profile) and a torque profile indicative of a time history of the torque of the carriage motor 16 (i.e., the aforementioned actual torque profile).

As is evident from the above description, in the present embodiment, the parameter memory 31a constitutes an example of the "storage" set forth in each of the above modes (1) and (14), a portion of the computer 50 which is assigned to execute the acceleration profile generation program 33a constitutes an example of the "acceleration profile generator" set forth in the above mode (1), and the acceleration-profile generation process which is implemented by the execution of the acceleration profile generation program 33a constitutes an example of the "acceleration profile generating step" set forth in the above mode (14).

Further, in the present embodiment, the carriage 11a (mechanically equivalent to a rotor of the carriage motor 16 or a belt moved by the rotor) constitutes an example of the "controlled object" set forth in each of the above modes (1) and (14), a portion of the computer 50 which is assigned to implement the steps S1002, S1010, and S1017 constitutes an example of each of the "first generating section" set forth in the above mode (2) and an example of the "second generating section" set forth in the above mode (3).

Still further, in the present embodiment, a portion of the computer 50 which is assigned to implement the steps S1005 and S1013 constitutes an example of the "third generating section" set forth in the above mode (4), a portion of the computer 50 which is assigned to implement the steps S1002, S1010, and S1017 constitutes an example of the "fifth generating section" set forth in the above mode (6).

Yet further, in the present embodiment, a portion of the computer 50 which is assigned to execute the acceleration profile generation program 33a constitutes an example of the "acceleration profile generator" set forth in the above mode (10), the first integrator 42 constitutes an example of the "target velocity profile generator" set forth in the same mode, the second integrator 43 constitutes an example of the "target position profile generator" set forth in the same mode, the carriage motor 16 constitutes an example of the "drive mechanism" set forth in the same mode, and the position control circuit 44 constitutes an example of the "controller" set forth in the same mode.

It is added that, in the present embodiment, the acceleration profile for achieving a movement of the carriage 11a moved by the carriage motor 16 is optimized by virtue of the present invention.

However, the present invention may be practiced in an alternative arrangement in which there is optimized an acceleration profile for a movement of the recording medium (technically equivalent to a rotor of the LF motor 40 or a sheet-feed roller rotated by the rotor), instead of or in addition to the acceleration profile for a movement of the carriage 11a.

It is further added that, in the present embodiment, the carriage motor 16 is controlled such that a target position profile and an actual position profile of the carriage 11a become closer to each other, by feeding back the actual position of the carriage 11a.

However, the present invention may be practiced in an alternative arrangement in which the carriage motor 16 is controlled such that a target velocity profile and an actual velocity profile of the carriage 11a become closer to each other, by feeding back the actual velocity of the carriage 11a, instead of or in addition to the control of the position of the carriage 11a.

In this arrangement, the actual velocity of the carriage 11a is determined, for example, through the calculation of differentiating with respect to time an actual position of the carriage 11a (e.g., the position of the carriage 11a detected by the carriage-motor encoder 17), or is determined directly using a velocity sensor directly detecting the actual velocity of the carriage 11a or its equivalent.

It is still further added that, in the present embodiment, a portion of the entire acceleration profile which corresponds to each of at least one non-constant-velocity phase is defined using the aforementioned equation (1).

As described above, equation (1) is derived to satisfy the conditions that, in the co-existence of a constant-velocity phase preceding a non-constant-velocity phase and a constant-velocity phase subsequent to the non-constant-velocity phase, the velocity of the carriage 11a for the preceding constant-velocity phase and the start velocity Vs of the carriage 11a for the non-constant-velocity phase are coincident with each other, and the end velocity Ve of the carriage 11a for the non-constant-velocity phase and the velocity of the carriage 11a for the subsequent constant-velocity phase are coincident with each other.

Therefore, in the present embodiment, the generation of a portion of an entire acceleration profile which corresponds to a non-constant-velocity phase using equation (1) is technically equivalent to a technique of achieving an ultimate result of the same portion such that a velocity of the carriage 11a obtained by integrating a provisional result of the same portion over an integral interval equal to the duration of the entire non-constant-velocity phase becomes equal to an velocity during a constant velocity phase following the non-constant-velocity phase, which velocity has been stored in the parameter memory 31a.

As a result, in the present embodiment, a portion of the computer 50 which is assigned for generating a portion of an entire acceleration profile which corresponds to a non-constant-velocity phase using equation (1) constitutes an example of the "fourth generating section" set forth in the above mode (5), and a process for performing the generation constitutes an example of the "fourth generating step" set forth in the above mode (18).

Alternatively, the present invention may be practiced in an arrangement in which, at first, the end velocity Ve of the carriage 11a for a non-constant-velocity phase is calculated by actually integrating a portion of an entire acceleration profile which corresponds to the non-constant-velocity phase over an integral interval equal to the duration of the entire non-constant-velocity phase.

In this arrangement, subsequently, an ultimate result of the same portion is finally generated such that the calculated end velocity Ve is coincident with the velocity occurring during a constant velocity phase following the non-constant-velocity phase, which velocity has been stored in the parameter memory 31a.

In this arrangement, a variable calculation formula (comparable with the aforementioned equation (1)), which is used for generating a portion of an entire acceleration profile which corresponds to a non-constant-velocity phase, is predefined to incorporate at least one tuning parameter. The tuning parameter is increased or decreased by a numerical search technique (e.g., a trial and error process), to thereby adapt the variable calculation formula to the velocity requirement. The adapted calculation formula is used to generate a portion of an entire acceleration profile which corresponds to a non-constant-velocity phase.

In this arrangement, a portion of the computer 50 which is assigned to perform the generation of a non-constant-velocity phase portion of an entire acceleration profile constitutes an example of the "fourth generating section" set forth in the above mode (5), and a step for performing the generation constitutes an example of the "fourth generating step" set forth in the above mode (18).

It is further added that, in the present embodiment, a non-constant-velocity phase portion of an entire acceleration profile is shaped as a pure sine curve. The sine curve is an example of a curve defined by a trigonometric function.

Alternatively, the present invention may be practiced in an arrangement in which a non-constant-velocity phase portion of an entire acceleration profile is shaped as a curve obtained by modifying a pure sine curve, or in an arrangement in which a non-constant-velocity phase portion of an entire acceleration profile is shaped as a curve defined by a function other than a trigonometric function.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for generating an acceleration profile indicative of a time history of an acceleration of a controlled object, to thereby generate at least one of a target velocity profile indicative of a time history of a target velocity of the controlled object and a target position profile indicative of a time history of a position of the controlled object, the apparatus comprising:

a storage storing a duration of a non-constant-velocity phase during which the target velocity of the controlled object varies with time; and an acceleration profile generator generating the acceleration profile, based on the duration of the non-constant-velocity phase stored in the storage, such that a portion of the acceleration profile which corresponds to the non-constant-velocity phase is generally curved.

2. The apparatus according to claim 1, wherein the acceleration profile generator includes a first generating section generating the acceleration profile, such that a portion of the acceleration profile which corresponds to the non-constant-velocity phase is shaped using a sine waveform.

3. The apparatus according to claim 1, wherein the acceleration profile generator includes a second generating section generating the acceleration profile, such that a portion of the acceleration profile which corresponds to the non-constant-velocity phase is shaped as a half-period of a sine waveform.

4. The apparatus according to claim 1, wherein the non-constant-velocity phase includes a first non-constant-velocity portion and a second non-constant velocity portion which have no overlap in time therebetween, wherein the storage further stores a duration of a constant velocity phase which is interposed between the first and second non-constant-velocity portions and during which a target velocity of the controlled object is substantially constant; and wherein the acceleration profile generator includes a third generating section generating the acceleration profile, based on the duration of the constant velocity phase stored in the storage, such that a portion of the acceleration profile which corresponds to the constant-velocity phase exhibits zero acceleration.

5. The apparatus according to claim 4, wherein the storage further stores a velocity which the controlled object is desired to be achieved during the constant velocity phase, wherein the acceleration profile generator includes a fourth generating section generating a portion of the acceleration profile which corresponds to the non-constant-velocity phase, such that there are coincident with each other, a velocity calculated by integrating accelerations of the controlled object occurring in accordance with a portion of the acceleration profile which corresponds to the non-constant-velocity phase, over an integral interval equal to the duration of the non-constant velocity phase, and the velocity of the constant velocity phase stored in the storage, which velocity is desired to be achieved by the controlled object after the controlled object passes the non-constant-velocity phase.

6. The apparatus according to claim 5, wherein the non-constant-velocity phase includes at least one non-constant-velocity portion, wherein the constant velocity phase includes at least one constant velocity portion, wherein the acceleration profile generator includes a fifth generating section generating the acceleration profile using the following equation:

$$a = (\pi(Ve - Vs)/2Ti)\sin((\pi/Ti)t),$$

where:

a is an acceleration of the controlled object;

Ve is an end speed of the controlled object for each of the at least one non-constant-velocity portion or each of the at least one constant velocity portion;

Vs is a start speed of the controlled object for each of the at least one non-constant-velocity portion or each of the at least one constant velocity portion;

Ti is a duration of each of the at least one non-constant-velocity portion or each of the at least one constant velocity portion; and t is an instant of time.

7. The apparatus according to claim 1, wherein the non-constant-velocity phase includes at least one acceleration phase and at least one deceleration phase, and
wherein the acceleration profile includes the at least one acceleration phase and the at least one deceleration phase, and at least one constant velocity phase disposed between adjacent two of the at least one acceleration phase and the at least one deceleration phase.

8. The apparatus according to claim 7, wherein the acceleration profile includes at least one of a set of at least two acceleration phases, a set of at least two deceleration phases, and a set of at least two constant velocity phases.

9. The apparatus according to claim 1, wherein the acceleration profile generator includes a modifier modifying a predefined reference waveform tunable in accordance with a plurality of tuning parameters, by specifying a value of each of the parameters, to thereby generate the acceleration profile.

10. An apparatus for forming an image using a motion of a movable member, comprising:
an acceleration profile generator generating an acceleration profile indicative of a time history of an acceleration of the movable member, the acceleration profile being usable for generating a target velocity profile indicative of a time history of a target velocity of the movable member and a target position profile indicative of a time history of a target position of the movable member;
a target velocity profile generator generating the target velocity profile by integrating accelerations of the movable member occurring in accordance with the generated acceleration profile;
a target position profile generator generating the target position profile by integrating velocities of the movable member occurring in accordance with the generated target velocity profile;
a drive mechanism driving the movable member; and
a controller controlling the drive mechanism, such that the generated target position profile and an actual position profile indicative of a time history of an actual position of the movable member become closer to each other,
wherein the acceleration profile generator generates the acceleration profile, such that a portion of the acceleration profile which corresponds to the non-constant-velocity phase is generally curved.

11. The apparatus according to claim 10, wherein the image is formed on a recording medium,
wherein the movable member includes a carriage reciprocally moved along a surface of the recording medium, and
wherein the drive mechanism includes a motor driven for moving the carriage.

12. The apparatus according to claim 11, wherein the carriage has an ink-jet recording head which is mounted on the carriage, and which is used to produce a relative motion between the ink-jet recording head and the recording medium.

13. The apparatus according to claim 10, wherein the image is formed on a recording medium,
wherein the movable member includes the recording medium, and
wherein the drive mechanism include a motor driven for feeding the recording medium.

14. A method of generating an acceleration profile indicative of a time history of an acceleration of a controlled object, to thereby generate at least one of a target velocity profile indicative of a time history of a target velocity of the controlled object and a target position profile indicative of a time history of a position of the controlled object, the method comprising:
a first storing step of storing in a storage, a duration of a non-constant-velocity phase during which the target velocity of the controlled object varies with time; and
an acceleration profile generating step of generating the acceleration profile, based on the duration of the non-constant-velocity phase stored in the storage, such that a portion of the acceleration profile which corresponds to the non-constant-velocity phase is generally curved.

15. The method according to claim 14, wherein the acceleration profile generating step includes a first generating step of generating the acceleration profile, such that a portion of the acceleration profile which corresponds to the non-constant-velocity phase is shaped using a sine waveform.

16. The method according to claim 14, wherein the acceleration profile generating step includes a second generating step of generating the acceleration profile, such that a portion of the acceleration profile which corresponds to the non-constant-velocity phase is shaped as a half-period of a sine waveform.

17. The method according to claim 14, wherein the non-constant-velocity phase includes a first non-constant-velocity portion and a second non-constant-velocity portion which have no overlap in time therebetween,
the method further comprising:
a second storing step of storing in the storage, a duration of a constant velocity phase which is interposed between the first and second non-constant-velocity portions and during which a target velocity of the controlled object is substantially constant; and
a third generating step of generating the acceleration profile, based on the duration of the constant velocity phase stored in the storage, such that a portion of the acceleration profile which corresponds to the constant-velocity phase exhibits zero acceleration.

18. The method according to claim 17, further comprising a third storing step of storing in the storage, a velocity which the controlled object is desired to be achieved during the constant velocity phase,
wherein the acceleration profile generating step includes a fourth generating step of generating a portion of the acceleration profile which corresponds to the non-constant-velocity phase, such that there are coincident with each other, a velocity calculated by integrating accelerations of the controlled object occurring in accordance with a portion of the acceleration profile which corresponds to the non-constant-velocity phase, over an integral interval equal to the duration of the non-constant velocity phase, and the velocity of the constant velocity phase stored in the storage, which velocity is desired to be achieved by the controlled object after the controlled object passes the non-constant-velocity phase.

19. The method according to claim 18, wherein the non-constant-velocity phase includes at least one non-constant-velocity portion,
wherein the constant velocity phase includes at least one constant velocity portion,
wherein the acceleration profile generating step includes a fifth generating step of generating the acceleration profile using the following equation:

$$a = (\pi(V_e - V_s)/2T_i)\sin((\pi/T_i)t),$$

where:

a is an acceleration of the controlled object;

Ve is an end speed of the controlled object for each of the at least one non-constant-velocity portion or each of the at least one constant velocity portion;

Vs is a start speed of the controlled object for each of the at least one non-constant-velocity portion or each of the at least one constant velocity portion;

Ti is a duration of each of the at least one non-constant-velocity portion or each of the at least one constant velocity portion; and t is an instant of time.

20. The method according to claim 14, wherein the non-constant-velocity phase includes at least one acceleration phase and at least one deceleration phase, and wherein the acceleration profile includes the at least one acceleration phase and the at least one deceleration phase, and at least one constant velocity phase disposed between adjacent two of the at least one acceleration phase and the at least one deceleration phase.

21. The method according to claim 20, wherein the acceleration profile includes at least one of a set of at least two acceleration phases, a set of at least two deceleration phases, and a set of at least two constant velocity phases.

22. The method according to claim 14, wherein the acceleration profile generating step includes a step of modifying a predefined reference waveform tunable in accordance with a plurality of tuning parameters, by specifying a value of each of the parameters, to thereby generate the acceleration profile.

* * * * *